US012620125B2

(12) United States Patent
Ko

(10) Patent No.: US 12,620,125 B2
(45) Date of Patent: May 5, 2026

(54) ELECTRONIC DEVICE FOR IDENTIFYING POSITION OF EXTERNAL OBJECT ASSOCIATED WITH IMAGE BY USING INFORMATION OF CAMERA AND METHOD THEREOF

(71) Applicant: THINKWARE CORPORATION, Seongnam-si (KR)

(72) Inventor: Sukpil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 278 days.

(21) Appl. No.: 18/226,944

(22) Filed: Jul. 27, 2023

(65) Prior Publication Data

US 2024/0037781 A1 Feb. 1, 2024

(30) Foreign Application Priority Data

Jul. 29, 2022 (KR) ........................ 10-2022-0094678
Jul. 13, 2023 (KR) ........................ 10-2023-0090943

(51) Int. Cl.
| | |
|---|---|
| *G06T 7/73* | (2017.01) |
| *G06T 5/80* | (2024.01) |
| *G06T 7/80* | (2017.01) |

(52) U.S. Cl.
CPC .................. *G06T 7/73* (2017.01); *G06T 5/80* (2024.01); *G06T 7/80* (2017.01); *G06T 2207/20084* (2013.01)

(58) Field of Classification Search
CPC ... G06T 2207/20084; G06T 7/80; G06T 5/80; G06T 7/73
See application file for complete search history.

(56) References Cited

U.S. PATENT DOCUMENTS

| | | | | |
|---|---|---|---|---|
| 2015/0036920 A1* | 2/2015 | Wu | ...................... | G06V 10/764 |
| | | | | 382/156 |
| 2017/0221226 A1* | 8/2017 | Shen | ......................... | G06T 7/80 |
| 2023/0113647 A1* | 4/2023 | Zeng | ......................... | G06T 7/73 |
| | | | | 345/419 |
| 2023/0145701 A1* | 5/2023 | Parchami | ............. | G06N 3/0464 |
| | | | | 382/103 |

* cited by examiner

*Primary Examiner* — John R Wallace
(74) *Attorney, Agent, or Firm* — WHDA, LLP

(57) ABSTRACT

An electronic device according to an embodiment may include a camera and a processor. The processor may be configured to obtain, from an image obtained using the camera, two-dimensional coordinate values representing vertices of a portion related to an external object. The processor may be configured to identify a first line extending along a reference direction on a reference plane included in the image and overlapping a first vertex of the vertices, and a second line connecting a reference point within the image and a second vertex of the vertices. The processor may be configured to, based on an intersection of the first line and the second line, obtain three-dimensional coordinate values representing each of vertices of a three-dimensional external space corresponding to the external object.

20 Claims, 14 Drawing Sheets

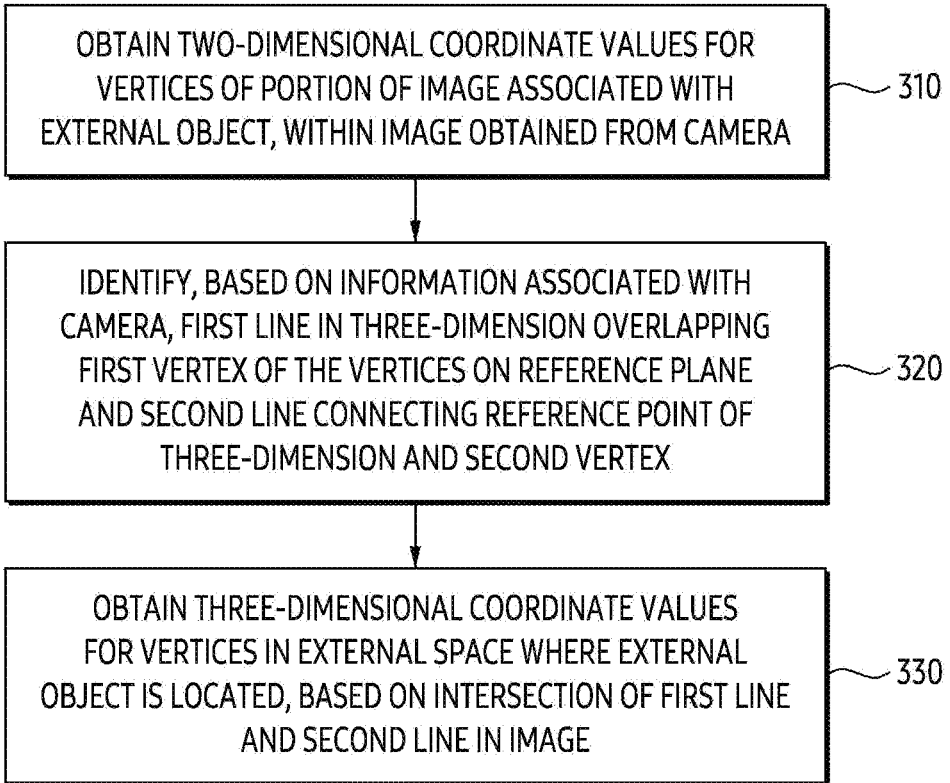

OBTAIN TWO-DIMENSIONAL COORDINATE VALUES FOR VERTICES OF PORTION OF IMAGE ASSOCIATED WITH EXTERNAL OBJECT, WITHIN IMAGE OBTAINED FROM CAMERA — 310

IDENTIFY, BASED ON INFORMATION ASSOCIATED WITH CAMERA, FIRST LINE IN THREE-DIMENSION OVERLAPPING FIRST VERTEX OF THE VERTICES ON REFERENCE PLANE AND SECOND LINE CONNECTING REFERENCE POINT OF THREE-DIMENSION AND SECOND VERTEX — 320

OBTAIN THREE-DIMENSIONAL COORDINATE VALUES FOR VERTICES IN EXTERNAL SPACE WHERE EXTERNAL OBJECT IS LOCATED, BASED ON INTERSECTION OF FIRST LINE AND SECOND LINE IN IMAGE — 330

ELECTRONIC DEVICE FOR IDENTIFYING POSITION OF EXTERNAL OBJECT ASSOCIATED WITH IMAGE BY USING INFORMATION OF CAMERA AND METHOD THEREOF

CROSS-REFERENCE TO RELATED APPLICATION(S)

This application is based on and claims priority under 35 U.S.C. § 119 to Korean Patent Application No. 10-2022-0094678, filed on Jul. 29, 2022, in the Korean Intellectual Property Office, and Korean Patent Application No. 10-2023-0090943, filed on Jul. 13, 2023, in the Korean Intellectual Property Office, the disclosures of which are incorporated by reference herein in their entirety.

BACKGROUND

Technical Field

The present disclosure relate to an electronic device for identifying a position of an external object associated with an image by using information of a camera and a method thereof.

Description of Related Art

Electronic devices and/or services based on object recognition techniques are being developed, including algorithms for inferring external objects captured in an image. For example, based on such object recognition techniques, one or more external objects (e.g., pedestrians, vehicles, etc.) may be recognized from images. Information including a result of recognizing one or more recognized external objects may be used to automate and/or replace actions of a user recognizing an external object, depending on the level of automation of a vehicle, such as for autonomous driving/autonomous driving.

SUMMARY

A scheme for identifying a position of an external object using only images obtained from a camera may be required.

According to an embodiment, an electronic device may comprise a camera and a processor. The processor may be configured to obtain, from an image obtained using the camera, two-dimensional coordinate values representing vertices of a portion related to an external object. The processor may be configured to identify a first line extending along a reference direction on a reference plane included in the image and overlapping a first vertex of the vertices, and a second line connecting a reference point within the image and a second vertex of the vertices. The processor may be configured to, based on an intersection of the first line and the second line, obtain three-dimensional coordinate values representing each of vertices of a three-dimensional external space corresponding to the external object.

According to an embodiment, a method of an electronic device may comprise obtaining, from an image obtained using a camera of the electronic device, two-dimensional coordinate values representing vertices of a portion related to an external object. The method may comprise identifying a first line extending along a reference direction on a reference plane included in the image and overlapping a first vertex of the vertices, and a second line connecting a reference point within the image and a second vertex of the vertices. The method may comprise, based on an intersection of the first line and the second line, obtaining three-dimensional coordinate values representing each of vertices of a three-dimensional external space corresponding to the external object.

According to an embodiment, a computer-readable storage medium may comprise instructions. The instructions may cause, when executed by a processor of an electronic device, the electronic device to obtain, from an image obtained using the camera, two-dimensional coordinate values representing vertices of a portion related to an external object. The instructions may cause, when executed by a processor of an electronic device, the electronic device to identify a first line extending along a reference direction on a reference plane included in the image and overlapping a first vertex of the vertices, and a second line connecting a reference point within the image and a second vertex of the vertices. The instructions may cause, when executed by a processor of an electronic device, the electronic device to, based on an intersection of the first line and the second line, obtain three-dimensional coordinate values representing each of vertices of a three-dimensional external space corresponding to the external object.

According to various embodiments, the electronic device may identify a position of the external object based solely on the image obtained from the camera.

BRIEF DESCRIPTION OF THE DRAWINGS

The above and other aspects, features, and advantages of certain embodiments of the disclosure will be more apparent from the following description, taken in conjunction with the accompanying, in which:

FIG. 3 illustrates an example flowchart to illustrate an operation of an electronic device, according to an embodiment;

FIGS. 8A to 8B illustrate an exemplary operation of an electronic device for identifying a position of an external object from a two-dimensional image;

DETAILED DESCRIPTION

Figure 1:
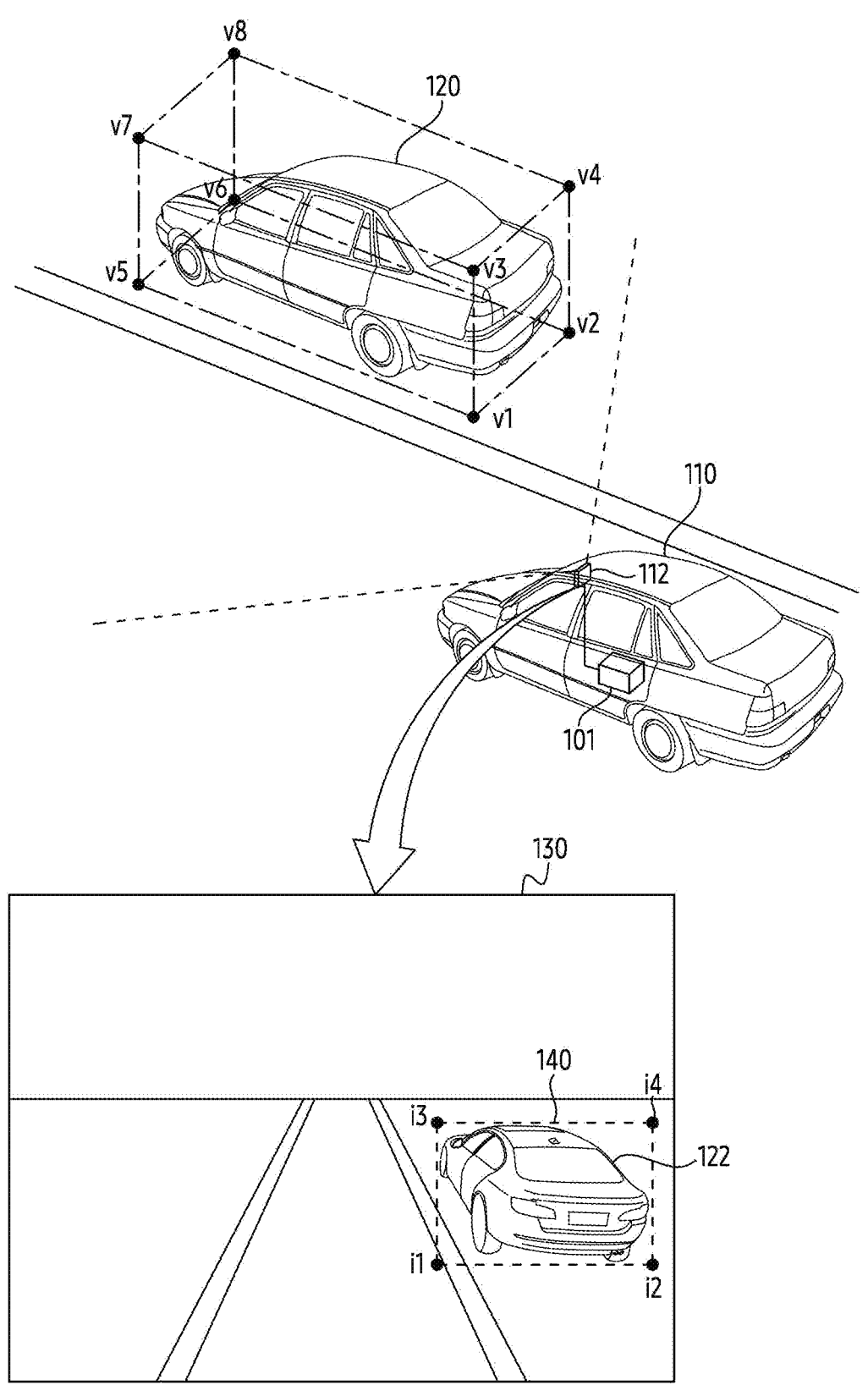
FIG. 1 illustrates an example of an electronic device for identifying a position of an external object using an image, according to an embodiment.

Hereinafter, various embodiments of the disclosure will be described in more detail with reference to the accompanying drawings. In connection with the description of the drawings, the same or similar reference numerals may be used for the same or related components.

FIG. 1 illustrates an embodiment of an electronic device 101 that identifies a position of an external object using an image. Referring to FIG. 1, an example of the electronic device 101 included in a first vehicle 110 is shown. The electronic device 101 may correspond to, or be incorporated into, an electronic control unit (ECU) in the first vehicle 110. The ECU may be referred to as an electronic control module (ECM). Alternatively, the electronic device 101 may be configured with stand-alone hardware for the purpose of providing functionality according to embodiments of the disclosure in the first vehicle 110. Embodiments of the disclosure are not limited thereto, and the electronic device 101 may correspond to, or be incorporated into, a device (e.g., a dashcam or black box) attached to the first vehicle 110.

According to an embodiment, the electronic device 101 may be electrically and/or operatively coupled to a camera 112 positioned toward one direction of the first vehicle 110. Referring to FIG. 1, a camera 112 positioned toward a front direction and/or a driving direction of the first vehicle 110 is illustrated as an example, but the orientation of the camera 112 is not limited to that illustrated in FIG. 1. While it is shown an embodiment that the electronic device 101 and the camera 112 are separated from each other, embodiments of the disclosure are not limited thereto, and the electronic device 101 and the camera 112 may be integrated within a single package or a single housing, such as a dashcam.

According to an embodiment, the electronic device 101 may recognize an external object (e.g., a second vehicle 120) included in field-of-view (FoV) of the camera 112, using an image 130 obtained from the camera 112. Recognizing the external object may include identifying a type, a class, and/or a category of the external object. For example, the electronic device 101 may identify a category corresponding to the external object captured by the image 130 from designated categories such as, e.g., vehicle, road, sign, and/or pedestrian. Recognizing the external object may include calculating the position (e.g., a three-dimensional coordinate value) of the external object relative to the camera 112 and/or the first vehicle 110.

Various embodiments described with reference to FIG. 1 and its following drawings may relate to the electronic device 101 for identifying and/or calculating a position of an external object, such as the second vehicle 120, a method of the electronic device 101, a computer program executable by the electronic device 101, and/or a computer-readable storage medium including the computer program. According to an embodiment, the electronic device 101 may identify the position of the external object using a single image 130 captured from a single camera 112. For example, the electronic device 101 may identify the position of the external object from the image 130 without a need for sensors and/or hardware to directly obtain three-dimensional coordinate values representing a position of an external object, such as e.g., time-of-flight (ToF), light detection and ranging (Li-DAR), radio detection and ranging (radar), sound navigation and ranging (SONAR), and/or stereo cameras.

For example, the electronic device 101 may identify, from the image 130, a visual object 122 corresponding to the external object (e.g., the second vehicle 120). The visual object 122 may include one or more pixels representing the external object among pixels included in the image 130. The electronic device 101 may recognize the external object based on the image 130 to identify a bounding box 140 in the image 130 corresponding to the visual object 122 that corresponds to the external object. From two-dimensional coordinate values of vertices (i1, i2, i3, i4) of the bounding box 140, the electronic device 101 may identify an external space occupied by the external object. For example, the electronic device 101 may obtain three-dimensional coordinate values of vertices (v1, v2, 3, v4, v5, v6, v7, v8) of the external space. For example, after obtaining the three-dimensional coordinate values of the vertices (v1, v2, 3, v4, v5, v6, v7, v8) of the external space corresponding to the second vehicle 120, the electronic device 101 may execute a function (e.g., path planning) for autonomous driving of the first vehicle 110, using a three-dimensional position of the second vehicle 120 indicated by the three-dimensional coordinate values.

Figure 2:
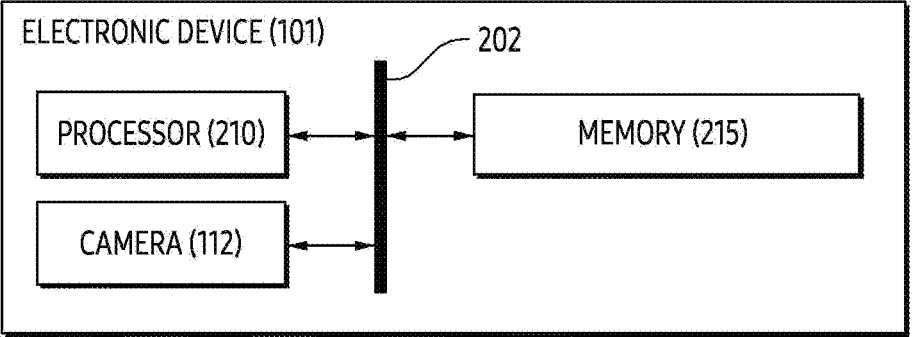
FIG. 2 illustrates an example of a block diagram of an electronic device, according to an embodiment.

FIG. 2 illustrates an example of a block diagram of the electronic device 101, according to an embodiment. The electronic device 101 of FIG. 1 may include, at least partially, the hardware included in the electronic device 101 described with reference to FIG. 2.

Referring to FIG. 2, the electronic device 101 may include at least one of a processor 210, a memory 215, or a camera 112, according to an embodiment. The processor 210, the memory 215, and the camera 112 may be electrically and/or operatively coupled to each other by an electronic component, such as a communication bus 202. As used herein, the devices and/or circuitry being operatively coupled may mean that a direct connection, or an indirect connection between the devices and/or circuitry is established wired, or wirelessly, such that a first circuit and/or a first device controls a second circuit and/or a second device. Although these hardware components are shown in different blocks, but the embodiments of the disclosure are not limited thereto. Some of the hardware of FIG. 2 may be incorporated into a single integrated circuit, such as a system-on-chip (SoC). The type and/or number of hardware components included in the electronic device 101 is not limited to that shown in FIG. 2. For example, the electronic device 101 may include only some of the hardware components shown in FIG. 2.

According to an embodiment, the electronic device 101 may include hardware for processing data based on one or more instructions. The hardware for processing the data may include the processor 210. For example, the hardware for processing the data may include an arithmetic and logic unit (ALU), a floating-point unit (FPU), a field programmable gate array (FPGA), a central processing unit (CPU), and/or an application processor (AP). The processor 210 may have the structure of a single-core processor, or may have the structure of a multi-core processor, such as e.g., a dual-core, a quad-core, a hexa-core, or an octa-core.

According to an embodiment, the memory 215 of the electronic device 101 may include hardware components for storing data and/or instructions that are input to and/or output from the processor 210 of the electronic device 101. For example, memory 215 may include a volatile memory, such as random-access memory (RAM), and/or a non-volatile memory, such as read-only memory (ROM). For example, the volatile memory may include at least one of dynamic RAM (DRAM), static RAM (SRAM), cache RAM, and pseudo SRAM (PSRAM). For example, the non-volatile memory may include at least one of programmable ROM (PROM), erasable PROM (EPROM), electrically erasable PROM (EEPROM), flash memory, hard disk, compact disk, solid state drive (SSD), embedded multi-media card (eMMC).

According to an embodiment, the camera 112 of the electronic device 101 may include a lens assembly, or an image sensor. The lens assembly may collect light emitted from a subject that is an object to capture an image. The lens assembly may include one or more lenses. According to an embodiment, the camera 112 may include a plurality of lens assemblies. For example, the camera 112 may have some of the plurality of lens assemblies having the same lens properties (e.g., angle of view, focal length, autofocus, f number, or optical zoom), or at least one lens assembly may have one or more lens properties that are different from the lens properties of the other lens assemblies. The lens properties may be referred to as intrinsic parameters for the camera 112. The intrinsic parameters may be stored in the memory 215 of the electronic device 101.

In an embodiment, the lens assembly may include a wide-angle lens or a telephoto lens. According to an embodiment, the flash may include one or more light emitting diodes (e.g., red-green-blue (RGB) LEDs, white LEDs, infrared LEDs, or ultraviolet LEDs), or a xenon lamp. For example, an image sensor in the camera 112 may convert light emitted or reflected from a subject and transmitted through the lens assembly into an electrical signal to obtain an image corresponding to the subject. According to an embodiment, the image sensor may include one image sensor selected from image sensors having different properties, such as, e.g., an RGB sensor, a black and white (BW) sensor, an IR sensor, or a UV sensor, a plurality of image sensors having the same properties, or a plurality of image sensors having different properties. Each image sensor included in the image sensors may be implemented with, for example, a charged coupled device (CCD) sensor or a complementary metal oxide semiconductor (CMOS) sensor.

According to an embodiment, the processor 210 of the electronic device 101 may acquire images using the camera 112. The processor 210 may compensate for distortion in the image caused by the lens of the camera 112 using inherent information stored in the memory 215. The operation and/or the intrinsic information performed by the electronic device 101 to compensate for the distortion of the image will be described with reference to FIGS. 4 and 5. For the image of which distortion has been compensated, the processor 210 may perform object recognition. Based on the object recognition, the processor 210 may identify a portion related to the external object within the distortion-compensated image. For example, the processor 210 may obtain two-dimensional coordinate values representing vertices of the portion, based on a two-dimensional coordinate system of the image. The portion may have the shape of a rectangle, such as a bounding box.

According to an embodiment, the electronic device 101 may identify a three-dimensional external space corresponding to the external object, based on the two-dimensional coordinate values identified from the image. For example, the electronic device 101 may obtain three-dimensional coordinate values of vertices of the external space. The electronic device 101 may obtain the three-dimensional coordinate values from the two-dimensional coordinate values, using extrinsic information (or extrinsic parameters) of the camera 112. The extrinsic information for the camera 112 may be stored in the memory 215 of the electronic device 101 and indicate a position and/or orientation of the camera 112 (e.g., a position and/or orientation of the camera 112 in the first vehicle 110 of FIG. 1). An operation of the electronic device 101 to obtain the three-dimensional coordinate values from the two-dimensional coordinate values will be described with reference to FIGS. 6 and 7, FIG. 8A and/or FIG. 8B.

Hereinafter, with reference to FIG. 3, description will be made of an operation of the electronic device 101 and/or the processor 210 for processing an image obtained from the camera 112 to identify in three-dimension a position of an external object captured by the image.

FIG. 3 illustrates an example flowchart to illustrate the operation of the electronic device, according to an embodiment. The electronic device 101 of FIGS. 1 and 2 may perform the operations of the electronic device described with reference to FIG. 3. For example, the electronic device 101 and/or the processor 210 of FIG. 2 may perform at least one of the operations of FIG. 3. In an embodiment, a computer-readable storage medium may be provided including software applications and/or instructions that cause the electronic device and/or the processor to perform the operations of FIG. 3.

Referring to FIG. 3, according to an embodiment, in operation 310, the processor of the electronic device may obtain two-dimensional coordinate values for vertices of a portion of an image associated with an external object within an image (e.g., the image 130 of FIG. 1) obtained from a camera (e.g., the camera 112 of FIGS. 1 and 2). The image in operation 310 may correspond to a single image acquired from a single camera. The image of operation 310 may correspond to a single image merged (or stitched) from images acquired from a plurality of cameras. For example, by merging images obtained from the plurality of cameras having at least partially overlapping FoV, the electronic device 101 may obtain the image of the operation 310. The single image corresponding to merging of the images obtained from the plurality of cameras may be referred to as a panoramic image.

According to an embodiment, the processor may perform post-processing onto the image obtained from the camera in order to obtain the two-dimensional coordinate values of the operation 310. The post-processing may include altering the image based on inherent information corresponding to the camera. For example, the processor may compensate for distortion of the image caused by a lens of the camera. To compensate for the distortion of the image, the processor may obtain, from the intrinsic information corresponding to the camera, information related to the distortion (e.g., information about field of view (FoV) of the lens, focal length, and/or shape of the lens). Using such a distortion-compensated image, the processor may obtain two-dimensional coordinate values of the motion 310.

According to an embodiment, the processor may identify the portion of the image in which the external object is captured, using a neural network input with the image of the operation 310. In an embodiment, the neural network may include a mathematical model of neural activities of a creature associated with reasoning and/or recognition, and/or hardware (e.g., central processing unit (CPU), graphic processing unit (GPU), and/or neural processing unit (NPU)), software, or any combination thereof, for driving the mathematical model. The neural network may be configured based on a convolutional neural network (CNN) and/or a long-short term memory (LSTM). According to an embodiment, the processor may use the neural network to obtain two-dimensional coordinate values of vertices of a shape (e.g., a rectangle) fitted to a portion of the image in which the external object is captured. the processor may use the neural network to identify the probabilities that the external object is matched to each of the specified categories.

Referring to FIG. 3, according to an embodiment, in operation 320, the processor of the electronic device may identify, based on information associated with the camera, a first line in three-dimension overlapping a first vertex of the vertices on a reference plane (e.g., on the ground) and a second line connecting a reference point of three-dimension and a second vertex. The information of operation 320 may include extrinsic information of the camera. The extrinsic information may include parameters (e.g., extrinsic parameters) indicative of height, orientation, and/or rotation (e.g., roll, pitch, and/or yaw) at which the camera is positioned. The extrinsic information may include the parameters about angle, orientation, and/or tilt between a central axis of the vehicle (e.g., the first vehicle 110 of FIG. 1), in which the camera is positioned, and the center of the image.

In an embodiment, the processor may identify the reference plane (e.g., the ground) within the image, based on information associated with the camera. For example, the processor may obtain three-dimensional coordinate values corresponding to pixels corresponding to the reference plane within the image, based on a position of the camera relative to the reference plane indicated by the information. The processor may identify, within the reference plane, a first line parallel to the reference direction (e.g., the travelling direction of the vehicle) of the camera and/or the vehicle where the camera is positioned and overlapping the first vertex of the vertices in the operation 310. The processor may identify a second line connecting the reference point (e.g., a point of three-dimensional position corresponding to a specific pixel on a central axis of the image) and the second vertex of the vertices. An example of the first line and the second line is illustrated with reference to FIG. 7, FIG. 8A and FIG. 8B.

Referring to FIG. 3, according to an embodiment, in operation 330, the processor of the electronic device may obtain three-dimensional coordinate values for vertices in the external space where the external object is located, based on the intersection of the first line and the second line in the image. The processor may obtain, based on the three-dimensional coordinate values assigned to one or more pixels of the image based on the reference plane, three-dimensional coordinate values of the intersection of the operation 330. The processor may estimate the vertices of the external space occupied by the external object, using a line extending from the intersection to other vertex that are different from the first vertex and the second vertex amongst the vertices of the operation 310. Operations performed by the processor to estimate the three-dimensional coordinate values of the vertices of the external space are described with reference to FIGS. 4 to 7 and FIGS. 8A to 8B.

Figure 4:
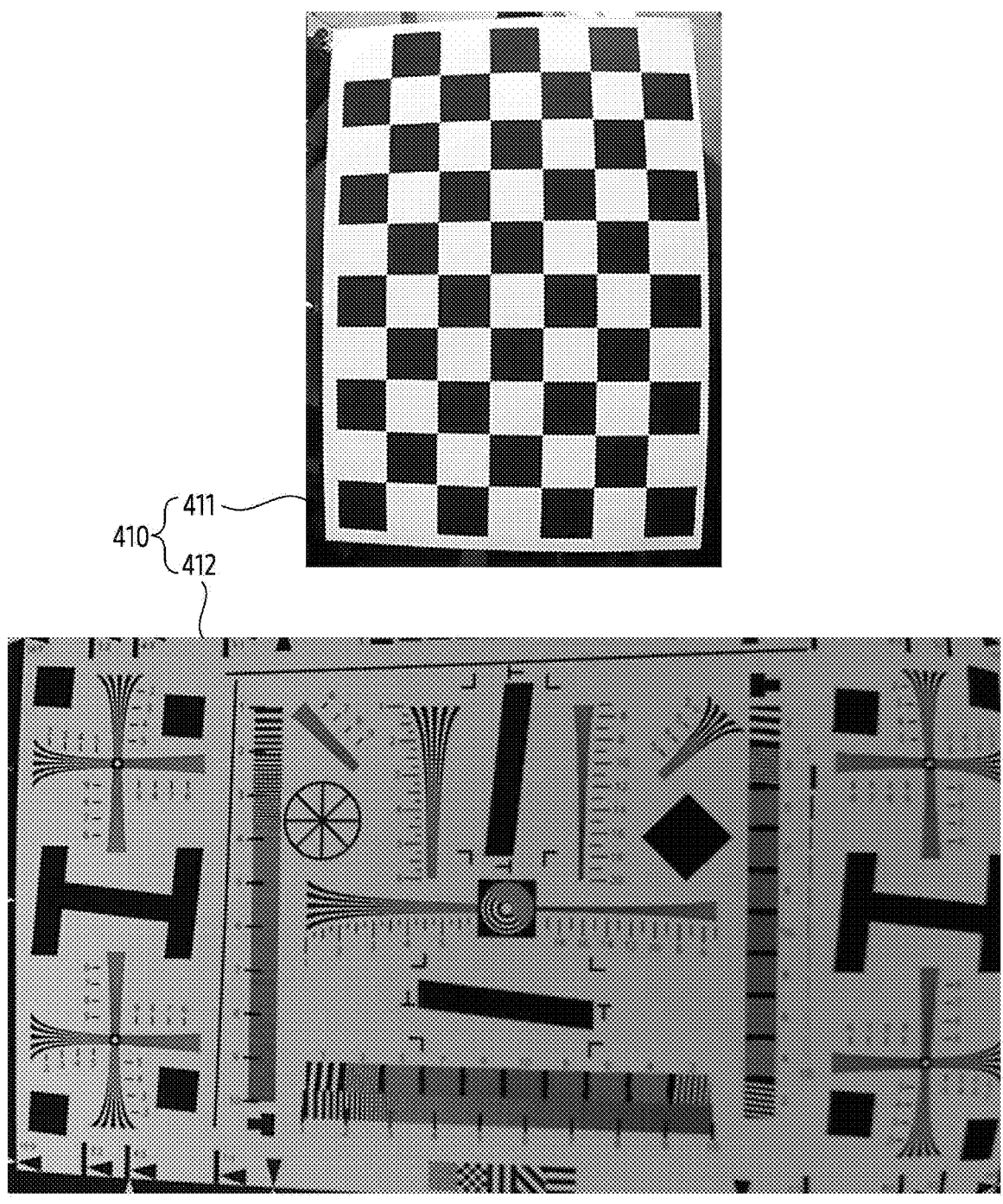
FIG. 4 illustrates an operation for obtaining intrinsic parameters of a camera of an electronic device, according to an embodiment.

FIG. 4 illustrates an operation for obtaining intrinsic parameters of a camera of an electronic device, according to an embodiment. The electronic device 101 of FIGS. 1 and 2 may perform the operations described with reference to FIG. 4. For example, the electronic device 101 and/or the processor 210 of FIG. 2 may perform the operations described with reference to FIG. 4. The camera of FIG. 4 may include the camera 112 of FIGS. 1 and 2.

Referring to FIG. 4, the electronic device according to an embodiment may obtain and/or calculate the intrinsic parameters, based on a result of capturing the external object 410 drawn with a specified pattern using the camera. Referring to FIG. 4, external objects 411 and 412 captured by the electronic device and having exemplary patterns are shown. For example, it is illustrated the external object 411 including a plane having the texture of a chess board with a repetitive arrangement of white and black squares. For example, it is illustrated the external object 412 printed with lines and/or patterns having different shapes.

In an embodiment, in order to obtain the intrinsic parameters, the electronic device may acquire images capturing the external object 410 from different angles and/or orientations. Each of the images may represent the external object 410 captured from such different directions.

According to an embodiment, the electronic device may obtain three-dimensional coordinate values for the images captured in each of the plurality of images, based on unprojection. For example, the electronic device may perform unprojection of a visual object included in each of the plurality of images and representing the external object, into a three-dimensional coordinate space corresponding to the external space. Based on the unprojection, the electronic device may obtain the three-dimensional coordinate values in the coordinate space corresponding to the two-dimensional coordinate values of the visual object included in each of the plurality of images. Based on the three-dimensional coordinate values, the electronic device may identify distortion in the images 410 caused by the lens of the camera. The electronic device may store information about the distortion as intrinsic parameters corresponding to the camera. The intrinsic parameters may be used to compensate for the distortion contained in the image and caused by the lens. Hereinafter, with reference to FIG. 5, description is made of an example of operation of the electronic device to compensate for the distortion based on the intrinsic parameters.

Figure 5:
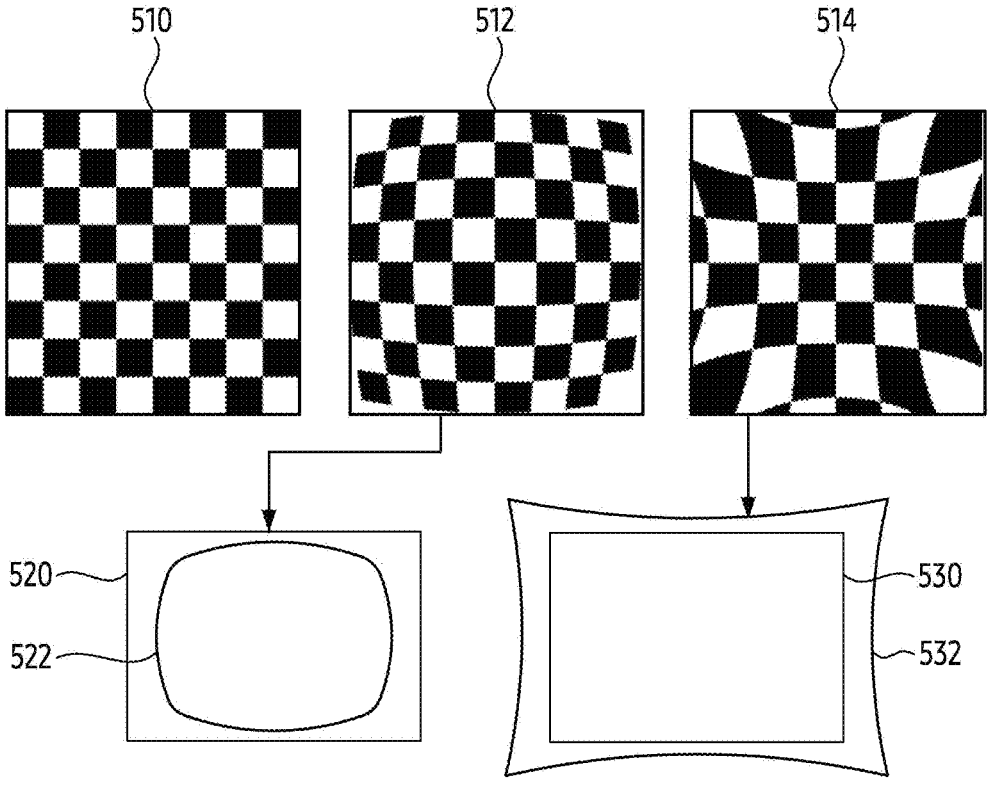
FIG. 5 illustrates an exemplary operation of an electronic device to compensate for distortion of an image caused by a lens of a camera, according to an embodiment.

FIG. 5 illustrates an exemplary operation of an electronic device for compensating for distortion of an image generated by a lens of a camera. The electronic device 101 of FIGS. 1 and 2 may perform the operation described with reference to FIG. For example, the electronic device 101 and/or the processor 210 of FIG. 2 may perform the operation described with reference to FIG. 5. The camera of FIG. 5 may include the camera 112 of FIGS. 1 and 2.

Referring to FIG. 5, exemplary images 510, 512 and 514 are shown to illustrate distortion of an image caused by a lens. The images 510, 512 and 514 may be obtained by capturing the same external object (e.g., an external object including a plane with squares arranged in repetition using cameras with different distortions. Comparing the image 510 obtained from a camera with no lens-induced distortion to the image 512 obtained from a camera with barrel distortion (or, negative radial distortion), a portion of the image 512 arranged around the center of the image may be more enlarged than the other portions. Likewise, comparing the image 510 with the image 514 obtained from a camera with pincushion distortion (or positive radial distortion), a portion of the image 514 including a periphery of the image 514 may be more enlarged than the center portion of image 514.

According to an embodiment, the electronic device may identify distortion contained in the lens, based on the intrinsic parameters corresponding to the camera. For example, the electronic device may identify, from the intrinsic parameters, the distortion introduced by the lens, from among the barrel distortion and/or the pincushion distortion described above. According to an embodiment, the processor of the electronic device may use the intrinsic parameters (e.g., focal length and/or distortion factor) to change the image. For example, the electronic device may change the image to obtain an image in which the distortion is compensated for.

According to an embodiment, the electronic device may change the image containing the distortion, based on the intrinsic parameters. For example, when the electronic device changes an image having the barrel distortion, such as image 512, a portion 522 where the barrel distortion occurs within the image may be altered like a portion 520. For example, when the electronic device changes the image having the pincushion distortion, such as in the image 514, a portion 532 within the image where the pincushion distortion has occurred may be altered like a portion 530.

According to an embodiment, the electronic device may compensate for the distortion in the image, based on Equation 1 and/or Equation 2.

$$p=K[R|t]*P \qquad \text{[Equation 1]}$$

wherein 'p' may be coordinates [u, v, 1] of an image, 'P' may be spatial coordinates [X, Y, Z, 1] corresponding to the coordinates of the image, and 'K' may be an intrinsic parameter, which may be a matrix including at least one of the following: a focal length in the x-axis (e.g., $f_x$ in Equation 2), a focal length in the y-axis (e.g., $f_y$ in Equation 2), a horizontal center axis of the image (e.g., $u_0$ in Equation 2), and a vertical center axis of the image (e.g., $v_0$ in Equation 2). Further, 'R' in the Equation 1 may be an intrinsic parameter, which may be a rotation matrix inclusive of rotation coefficients for rotation of the coordinates (e.g., $r_{11}$ to $r_{33}$ in Equation 2). 't' in the Equation 1 is an intrinsic parameter, which may be a translation matrix for movement in the coordinate space.

$$s\begin{bmatrix} u \\ v \\ 1 \end{bmatrix} = \begin{bmatrix} f_x & 0 & u_0 \\ 0 & f_y & v_0 \\ 0 & 0 & 1 \end{bmatrix}\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}\begin{bmatrix} X \\ Y \\ Z \\ 1 \end{bmatrix} \qquad \text{[Equation 2]}$$

The electronic device may compensate for the distortion of the image, based on the Equation 3 below, in case where a skew caused by the lens is identified based on the intrinsic parameter. The skew may be set to an average value of skewing introduced to the lens during the manufacturing process, based on the tolerance range that may be allowed in the manufacturing process of the lens, or may be omitted (e.g., zero).

$$s\begin{bmatrix} u \\ v \\ 1 \end{bmatrix} = \begin{bmatrix} f_x & skew\_cf_x & c_x \\ 0 & f_y & c_y \\ 0 & 0 & 1 \end{bmatrix}\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}\begin{bmatrix} X \\ Y \\ Z \\ 1 \end{bmatrix} \qquad \text{[Equation 3]}$$

$$= A[R|t]\begin{bmatrix} X \\ Y \\ Z \\ 1 \end{bmatrix}$$

According to an embodiment, the electronic device may calculate the parameters (k1, k2) indicating the distortion of the image from the intrinsic parameters, based on the Equation 4 below.

$$\check{x}=x+x[k_1(x^2+y^2)+k_2(x^2+^2)^2]$$

$$\check{y}=y+y[k_1(x^2+y^2)+k_2(x^2+y^2)^2] \qquad \text{[Equation 4]}.$$

According to an embodiment, the electronic device may obtain information (e.g., a mapping table and/or a transformation matrix) for compensating for the distortion, based on a relationship of coordinates between the image before compensating for the distortion and the image after compensating for the distortion. Using the information, the electronic device may shift the pixels of the image and/or video obtained from the camera to compensate for the distortion caused by the lens.

Figure 6:
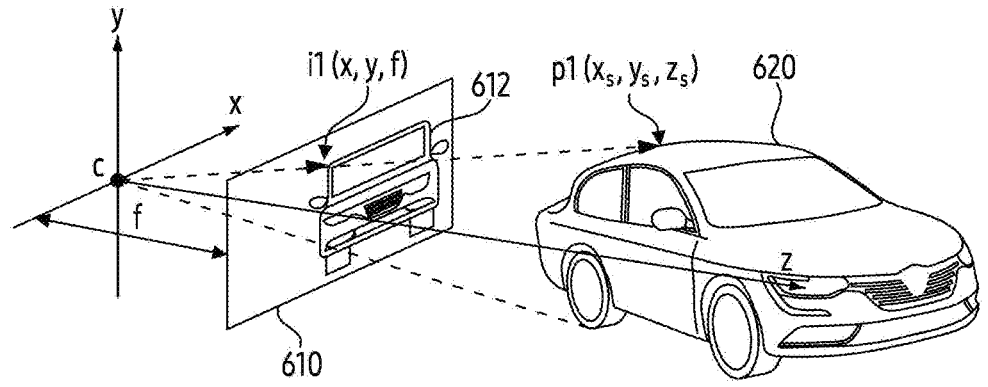
FIG. 6 illustrates an exemplary operation of an electronic device for identifying a position of an external object in a three-dimensional external space from a two-dimensional image.

FIG. 6 illustrates an example operation of an electronic device for identifying a position of an external object in a three-dimensional external space from a two-dimensional image. The electronic device 101 of FIGS. 1 and 2 may perform the operation described with reference to FIG. 6. For example, the electronic device 101 and/or the processor 210 of FIG. 2 may perform the operation described with reference to FIG. 6.

According to an embodiment, the electronic device may obtain, based on the unprojection, three-dimensional coordinates of an external object 620 (e.g., a vehicle) captured by the image 610, from an image 610 that has been compensated for the distortion introduced by the lens. For example, the electronic device that has identified a visual object 612 corresponding to the external object 620 within the image 610, may obtain coordinates $(x_i, y_i, f)$ of a point i1 of the visual object 612 within a three-dimensional coordinate space including a point C corresponding to a position of the camera. Based on the Equation 5 below, the electronic device may identify three-dimensional coordinates $(x_s, y_s, z_s)$ of a point p1 of the external object 620 corresponding to the point i1.

$$x_i = f\frac{x_S}{z_S}, \quad y_i = f\frac{y_S}{z_S} \qquad \text{[Equation 5]}$$

According to an embodiment, the electronic device may obtain coordinate values of six vertices of a rectangular parallelepiped (e.g., a cube) enclosing the external object 620, from coordinates of the point i1 associated with the visual object 612 in the image 610. Hereinafter, an exemplary operation of the electronic device for obtaining the coordinate values of the six vertices will be described with reference to FIG. 7, FIG. 8A, and/or FIG. 8B.

Figure 7:
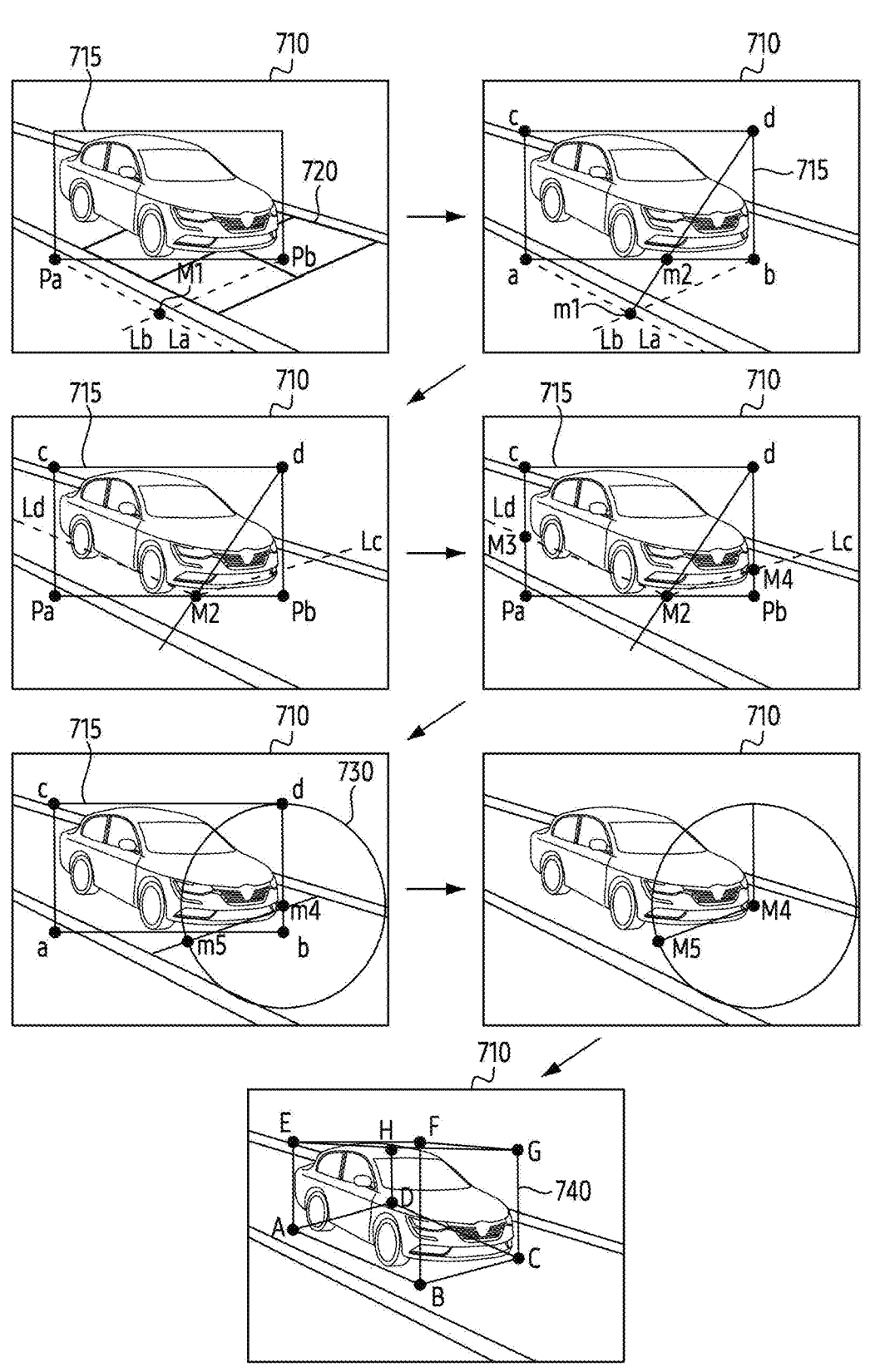
FIG. 7 illustrates an exemplary operation of an electronic device for identifying a position of an external object from a two-dimensional image.

FIG. 7 illustrates an exemplary operation of an electronic device for identifying a position of an external object from a two-dimensional image. The electronic device 101 of FIGS. 1 and 2 may perform the operation described with reference to FIG. 7. For example, the electronic device 101 and/or the processor 210 of FIG. 2 may perform the operation described with reference to FIG. 7.

Referring now to FIG. 7, an image 710 obtained from a camera positioned in a side mirror of a first vehicle including the electronic device (e.g., the first vehicle 110 of FIG. 1) is illustrated by way of an example. The image 710 may be an image that has been corrected for distortions identified by the intrinsic parameters of the camera. In case where an external object is not captured partially by the boundaries of the image 710, the processor may obtain from the image 710 a set of three-dimensional coordinate values indicative of the position of the external object. For a second vehicle traveling in a direction parallel to the first vehicle having the electronic device, like the second vehicle captured in the image 710, the processor may obtain three-dimensional coordinate values indicative of the position of the second vehicle. In FIG. 7, the points labeled with lowercase letters may indicate points in the image 710 that have two-dimensional coordinate values. In FIG. 7, the points labeled with uppercase letters may indicate points in the external space to which the image 710 is mapped, having a set of three-dimensional coordinate values.

Referring to FIG. 7, the electronic device according to an embodiment may identify a portion 715 within the image 710 associated with the external object (e.g., the second vehicle), based on object recognition. The electronic device may identify the portion 715 having a rectangular shape, such as a bounding box. For example, the electronic device may obtain two-dimensional coordinate values of vertices (a, b, c, d) of the portion 715 in the image 710, using a neural network input with the image 710. Along with the coordinate values, the electronic device may obtain a dimension (e.g., length, width, and/or height) of the external object corresponding to the vehicle, based on the type of the external object included in the portion 715.

Referring to FIG. 7, the electronic device may identify a three-dimensional position of the camera, based on the extrinsic parameters of the camera. Based on the three-dimensional position, the electronic device may identify a reference plane 720 corresponding to the ground. The electronic device may identify three-dimensional points (Pa, Pb) of the vertices (a, b) amongst the vertices (a, b, c, d), by performing unprojection (e.g., the unprojection as described with reference to FIG. 6) to the vertices (a, b) adjacent to a bottom end of the image 710. The processor may identify a first line La where the three-dimensional point Pa is located, extending along a first direction of the reference plane 720 (e.g., the travelling direction of the vehicle having the electronic device). The processor may identify a second line Lb where the three-dimensional point Pb is located, extending along a second direction perpendicular to the first direction on the reference plane 720 (e.g., a direction perpendicular to the travelling direction of the vehicle having the electronic device). The electronic device may identify an intersection M1 of the first line La and the second line Lb.

Referring to FIG. 7, for the three-dimensional intersection M1, the electronic device may identify a two-dimensional point m1 corresponding to the three-dimensional intersection M1 within the image 710. The electronic device may identify an intersection m2 of the two-dimensional line connecting the two-dimensional point m1 and the vertex d of the portion 715, and the two-dimensional line connecting the vertices (a, b). By performing unprojection to the intersection point m2, the electronic device may obtain coordinates of a three-dimensional point M2 corresponding to the intersection point m2. The electronic device may identify a third line Lc extending from the three-dimensional point M2 along the second direction of the reference plane 720 corresponding to the ground, and a fourth line Ld extending from the three-dimensional point M2 along the first direction.

Referring to FIG. 7, the electronic device identify a three-dimensional point M4 at an intersection m3 of the line connecting the vertices (b, c) and the third line Lc. The electronic device may perform the unprojection to the intersection of the line connecting the vertices (a, c) and the fourth line Ld to identify a three-dimensional point M3. Within the image 710, the electronic device may identify a circle 730 having as its radius the line connecting the intersection point m3 and the vertex d. The radius may correspond to the height (or full height) of the external object corresponding to the portion 715. The electronic device may identify a three-dimensional point M5 corresponding to the intersection m5 of the third line Lc and the circle 730.

According to an embodiment, the electronic device may determine each of the three-dimensional points (M3, M2, M4) as vertices (A, B, C) of an external space 740 of a rectangular parallelepiped occupied by an external object. Based on the characteristics of a parallelogram, the electronic device may obtain three-dimensional coordinate values of a vertex D of a base surface of the external space 740 from the vertices (A, B, C). The electronic device may parallel-shift at least one of the vertices (A, B, C, D), based on the height of the external object, as indicated by a distance between the three-dimensional points (M4, M5). Based on the parallel shift, the electronic device may obtain three-dimensional coordinate values of the vertices (E, F, G, H) on the top surface of the external space 740.

As described above, the electronic device according to an embodiment may obtain three-dimensional coordinate values of vertices (A, B, C, D, E, F, G, H) of the external space 740 that are occupied by the external object, from the image 710, using intrinsic and/or extrinsic parameters of the camera. The electronic device may identify, within the three-dimensional coordinate space, a distance between the second vehicle and the first vehicle located in the external space 740, based on a minimum distance between the cuboid corresponding to the first vehicle (e.g., the first vehicle 110 of FIG. 1) having the electronic device and the cuboid represented by the vertices (A, B, C, D, E, F, G, H).

Figure 8A:
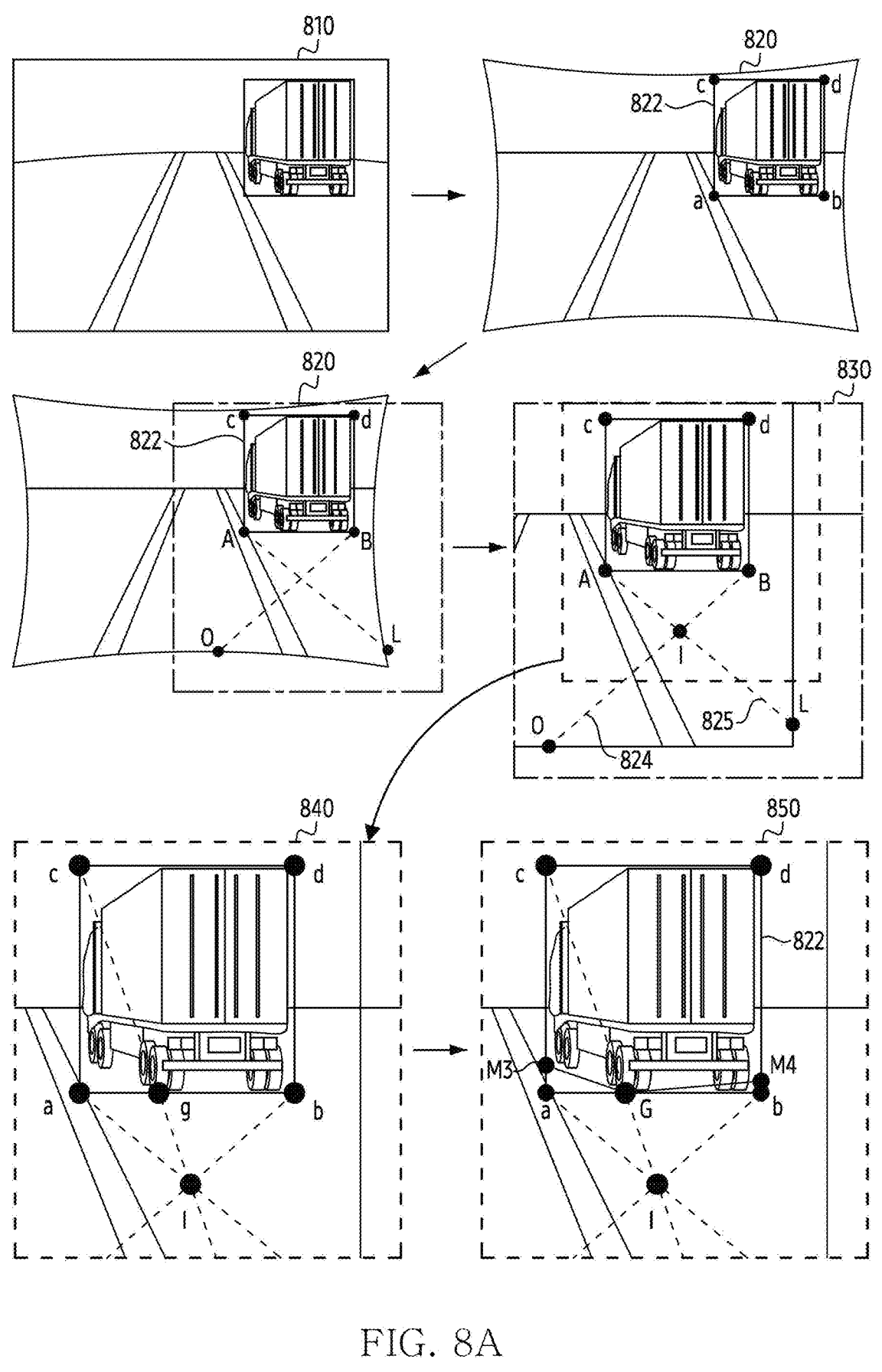
Figure 8B:
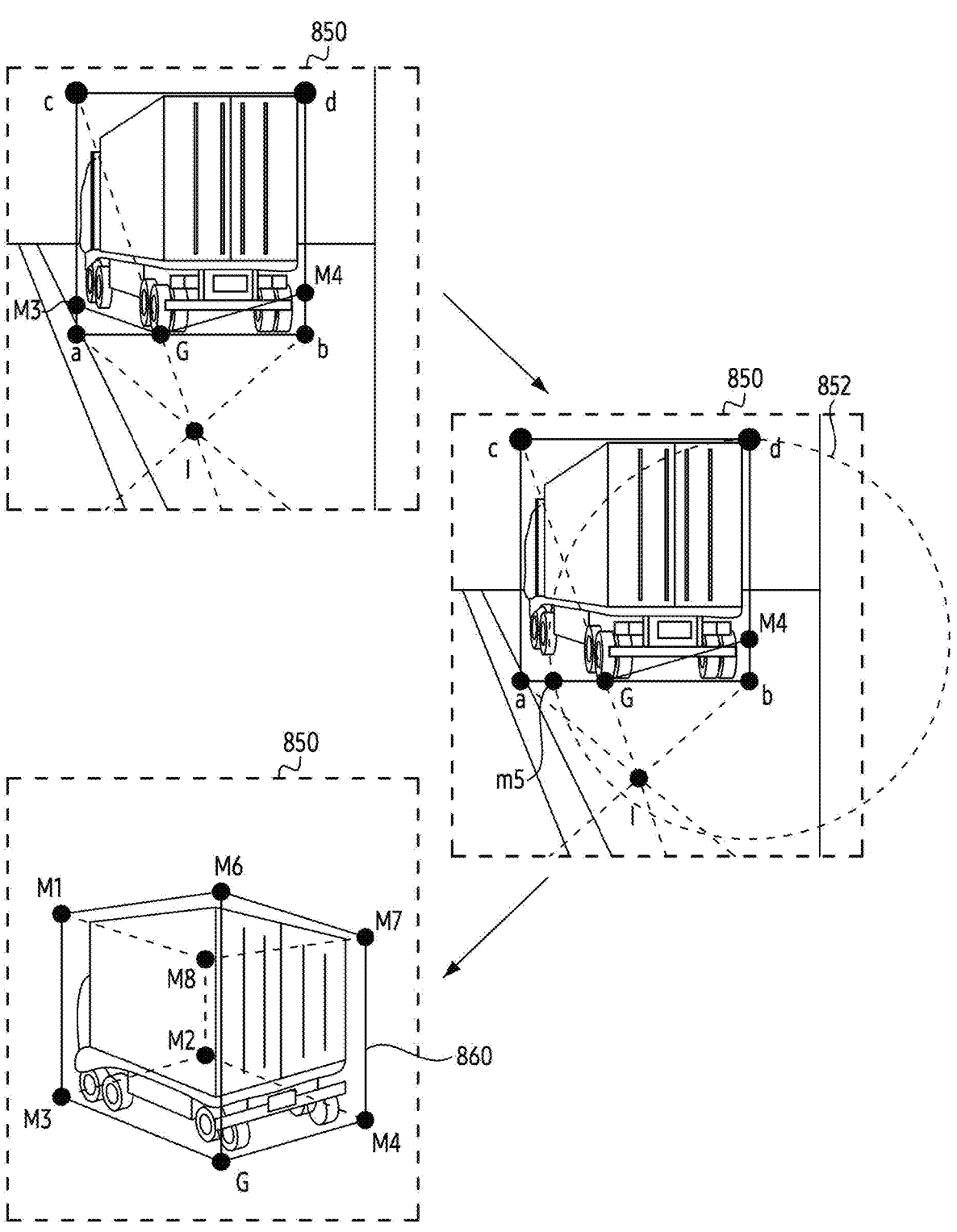

FIGS. 8A through 8B illustrate exemplary operation of an electronic device for identifying a position of an external object from a two-dimensional image. The electronic device 101 of FIGS. 1 and 2 may perform the operations described with reference to FIGS. 8A and 8B. For example, the electronic device 101 and/or the processor 210 of FIG. 2 may perform the operations described with reference to FIGS. 8A and 8B. The operations of the electronic device described with reference to FIGS. 8A and 8B may be performed, at least in part, similar to those described with reference to FIG. 7.

Referring to FIG. 8A, the electronics may compensate for distortions included in an image 810 obtained from a camera (e.g., the camera 112 of FIG. 1) and caused by a lens of the camera. The distortion may be identified by intrinsic parameters corresponding to the camera (e.g., the intrinsic parameters stored in the memory 215 in FIG. 2). The electronic device may obtain an image 820 from the image 810 to compensate for the distortion. By performing object recognition based on the image 820, the electronic device may identify a portion 822 within the image 820 related to an external object. The electronic device may obtain two-dimensional coordinate values (e.g., coordinate values of points (a, b, c and d)) within the image 820 indicating the portion 822. In FIG. 8A and/or FIG. 8B, the points labeled with lowercase letters may indicate points in image 710 that have two-dimensional coordinate values. In FIG. 8A and/or FIG. 8B, the points labeled with uppercase letters may be points within the external space to which the image 710 is mapped, having three-dimensional coordinate values.

Referring to FIG. 8A, the electronic device may identify a three-dimensional position of the camera, based on the extrinsic parameters of the camera. Based on the three-dimensional position, the electronic device may identify a first line 824 connecting the origin O and a three-dimensional point B corresponding to the unprojection of the vertex b of the portion 822, within the three-dimensional coordinate space. In the three-dimensional coordinate space, the electronic device may identify a second line 825 that is parallel to the travelling direction of the first vehicle having the electronic device (e.g., the first vehicle 110 of FIG. 1) and extends from a three-dimensional point A corresponding to the unprojection of the vertex a of the portion 822.

Referring now to FIG. 8A, a portion 830 of the image 820 is shown enlarged, wherein it may be identified a two-dimensional point corresponding to a three-dimensional intersection I of the first line 824 and the second line 825, and an intersection g of a line connecting a vertex c of the portion 822 and a line connecting the vertices (a, b). The electronic device may perform the unprojection to the intersection g to identify a three-dimensional point G corresponding to the intersection g.

Similar to the operation of the electronic device to obtain the three-dimensional points (M3, M4) from the three-dimensional point M2 in FIG. 7, the electronic device may identify the three-dimensional points (M3, M4) from the three-dimensional point G. For example, the electronic device may identify a three-dimensional point M3 corresponding to an intersection of a line extending along the travelling direction of the first vehicle and a line connecting the vertices (a, c). The electronic device may identify a three-dimensional point M4 corresponding to an intersection of a line extending from the three-dimensional point G along a direction perpendicular to the travelling direction of the first vehicle and a line connecting the vertices (b, d).

In an embodiment, the electronic device may identify a height (or full height) of the external object corresponding to the portion 822, based on the relationship between the three-dimensional point M4 and the portion 822. Referring to FIG. 8b, the electronic device may identify, on a line connecting the vertices (b, d), a two-dimensional point corresponding to the three-dimensional point M4 and a circle 852 having the vertex d as its radius. Based on the intersection m5 between the circle 852 and the line connecting the three-dimensional points (G, M4), the electronic device may identify the height of the external object.

As described above, the electronic device may determine the three-dimensional points (M3, G, M4) identified from the vertices (a, b, c, d) of the portion 822 as the vertices of the bottom surface of the external space 860 occupied by the external object. The electronic device may identify the remaining vertex M2 of the bottom surface, based on the characteristics of the parallelogram. The electronic device may identify the vertices (M1, M6, M7, M8) of the top surface of the external space 860 by parallel-shifting the vertices (M3, G, M4, M2) based on the identified height. The electronic device may use the external space 860 in which the external object is located, as indicated by the three-dimensional vertices (M3, G, M4, M2, M1, M6, M7, M8), to execute the functions related to autonomous driving.

Figure 9:
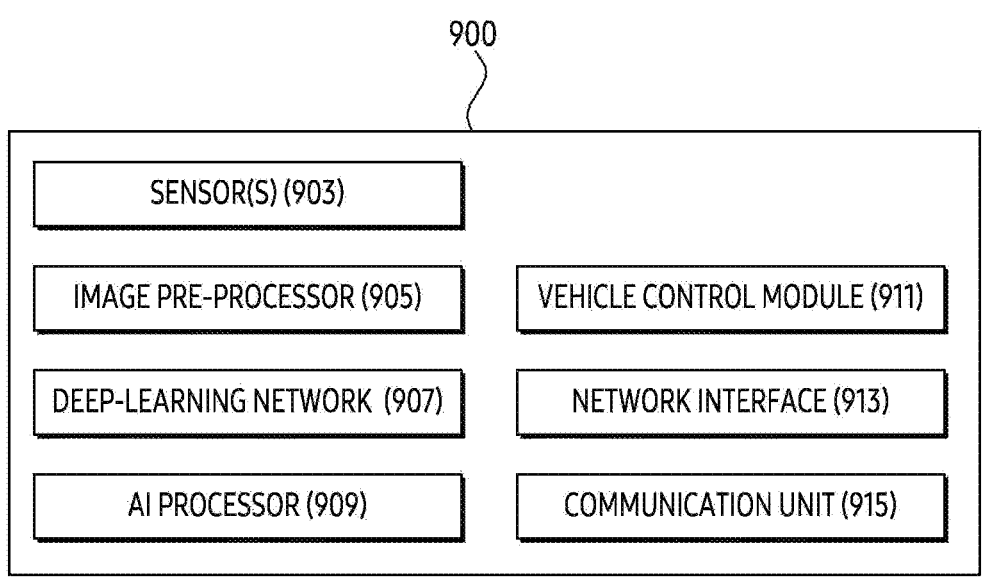
FIG. 9 illustrates an example of a block diagram depicting an autonomous driving system of a vehicle, according to an embodiment.

FIG. 9 illustrates an example of a block diagram depicting an autonomous driving system of a vehicle, according to an embodiment.

The autonomous driving control system 900 of a vehicle according to FIG. 9 may be a deep-learning network including a sensor(s) 903, an image pre-processor 905, a deep-learning network 907, an artificial intelligence (AI) processor 909, a vehicle control module 911, a network interface 913, and a communication unit 915. In various embodiments, each component may be connected via various interfaces. For example, sensor data sensed and output by the sensors 903 may be fed to the image pre-processor 905. The sensor data processed by the image pre-processor 905 may be fed to the deep-learning network 907 run by the AI processor 909. The output of the deep-earning network 907 run by the AI processor 909 may be fed to the vehicle control module 911. Intermediate results of the deep-learning network 907 running in the AI processor 909 may be fed to the AI processor 909. In various embodiments, the network interface 913 may communicate with in-vehicle electronics to transmit autonomous driving route information and/or autonomous driving control instructions to internal block configurations for autonomous driving of the vehicle. In some embodiments, the network interface 913 may be used to transmit the sensor data acquired via the sensor(s) 903 to an external server. In some embodiments, the autonomous driving control system 900 may include additional or fewer components as appropriate. For example, in some embodiments, the image pre-processor 905 may be an optional component. In another example, a post-processing component (not shown) may be included within the autonomous driving control system 900 to perform a post-processing on the output of the deep-learning network 907 before the output is provided to the vehicle control module 911.

In some embodiments, the sensors 903 may include one or more sensors. In various embodiments, the sensors 903 may be attached to different positions on the vehicle. The sensors 903 may face in one or more different directions. For example, the sensors 903 may be attached to the front, sides, rear, and/or roof of the vehicle to face directions in forward-facing, rear-facing, side-facing, or the like. In some embodiments, the sensors 903 may be image sensors, such as e.g., high dynamic range cameras. In some embodiments, the sensors 903 may include non-visual sensors. In some embodiments, the sensors 903 may include radar, light detection and ranging (LiDAR), and/or ultrasonic sensors in addition to image sensors. In some embodiments, the sensors 903 are not mounted onto the vehicle having the vehicle control module 911. For example, the sensors 903 may be included as part of a deep-learning system for capturing sensor data and may be attached to the surrounding environment or roadways and/or mounted onto any nearby vehicles.

In some embodiments, the image pre-processor 905 may be used to pre-process sensor data from the sensors 903. For example, the image pre-processor 905 may be used to pre-process the sensor data, to split the sensor data into one or more components, and/or to post-process the one or more components. In some embodiments, the image pre-processor 905 may be a graphics processing unit (GPU), a central processing unit (CPU), an image signal processor, or a specialized image processor. In various embodiments, the image pre-processor 905 may be a tone-mapper processor for processing high dynamic range data. In some embodiments, the image pre-processor 905 may be a component of the AI processor 909.

In some embodiments, the deep-learning network 907 may be a deep-learning network for implementing control commands to control an autonomous vehicle. For example, the deep-learning network 907 may be an artificial neural network, such as e.g., a convolutional neural network (CNN) trained using sensor data, and the output of the deep-learning network 907 may be provided to the vehicle control module 911.

In some embodiments, the artificial intelligence (AI) processor 909 may be a hardware processor for running the deep-learning network 907. In some embodiments, the AI processor 909 is a specialized AI processor for performing inference via a convolutional neural network (CNN) for sensor data. In some embodiments, the AI processor 909 may be optimized for the bit depth of the sensor data. In some embodiments, the AI processor 909 may be optimized for the deep-learning operations, such as operations in neural networks that include convolution, inner product, vector, and/or matrix operations. In some embodiments, the AI processor 909 may be implemented with a plurality of graphics processing units (GPUs) that can effectively perform parallel processing.

In various embodiments, the AI processor 909 may be coupled via an input/output interface to a memory configured to provide the AI processor with instructions that cause the AI processor 909, while its execution, to perform deep-learning analysis on sensor data received from the sensor(s) 903 and determine a machine learning result used to operate the vehicle at least partially in an autonomous manner. In some embodiments, the vehicle control module 911 may be used to process instructions for controlling the vehicle output from the artificial intelligence (AI) processor 909 and to translate the output of the AI processor 909 into instructions for controlling each of various modules of the vehicle. In some embodiments, the vehicle control module 911 may be used to control the vehicle for autonomous driving. In some embodiments, the vehicle control module 911 may adjust the steering and/or speed of the vehicle. For example, the vehicle control module 911 may be used to control overall driving of the vehicle, such as e.g., decelerating, accelerating, steering, lane changing, lane keeping, or the like. In some embodiments, the vehicle control module 911 may generate control signals to control vehicle lighting, such as brake lights, turn signals, headlights, and so on. In some embodiments, the vehicle control module 911 may be used to control an audio-related system of the vehicle, such as a vehicle sound system, a vehicle audio warning system, a vehicle microphone system, a vehicle horn system, and the like.

In some embodiments, the vehicle control module 911 may be used to control notification systems, including an alert system for notifying the passengers and/or driver of driving events, such as e.g., approaching an intended destination or a potential collision. In some embodiments, the vehicle control module 911 may be used to adjust sensors such as the sensors 903 of the vehicle. For example, the vehicle control module 911 may modify the orientation of the sensors 903, change the output resolution and/or format type of the sensors 903, increase or decrease the capture rate, adjust the dynamic range, or adjust focusing of the camera. In addition, the vehicle control module 911 may turn on/off the activation of the sensors individually or collectively.

In some embodiments, the vehicle control module 911 may be used to vary the parameters of the image pre-processor 905, such as by modifying frequency ranges of filters, adjusting edge detection parameters for detecting the features and/or the objects, adjusting channels and bit depth, or the like. In various embodiments, the vehicle control module 911 may be used to control autonomous driving of the vehicle and/or driver assistance features of the vehicle.

In some embodiments, the network interface 913 may serve as an internal interface between the block configuration of the autonomous driving control system 900 and the communication unit 915. Specifically, the network interface 913 may serve as a communication interface for receiving and/or transmitting data including voice data. In various embodiments, via the communication unit 915, the network interface 913 may be connected to external servers to connect voice calls, receive and/or send text messages, transmit sensor data, update operating software of the vehicle with an autonomous driving system, or update the software of the autonomous driving system of the vehicle.

In various embodiments, the communication unit 915 may include various wireless interfaces of cellular or WiFi types. For example, the network interface 913 may be used to receive updates of operating parameters and/or instructions for the sensors 903, the image pre-processor 905, the deep-learning network 907, the AI processor 909, and/or the vehicle control module 911, from external servers connected via the communication unit 915. For example, a machine learning model of the deep-learning network 907 may be updated using the communication unit 915. As another example, the communication unit 915 may be used to update the operating parameters of the image pre-processor 905 such as image processing parameters, and/or firmware of the sensors 903.

In another embodiment, the communication unit 915 may be used to activate communication for emergency contact and/or emergency services in an accident or near-accident event. For example, in a collision event, the communication unit 915 may be used to call emergency services for assistance, and may be used to externally notify emergency services of the details of the collision and the location of the vehicle in emergency. In various embodiments, the communication unit 915 may update or obtain an expected time of arrival and/or a destination location.

According to an embodiment, the autonomous driving system 900 illustrated in FIG. 9 may be configured with the electronics of the vehicle. According to an embodiment, when an autonomous driving release event occurs from a user during autonomous driving of the vehicle, the AI processor 909 of the autonomous driving control system 900 may control the autonomous driving software of the vehicle to be learned by controlling information related to the autonomous driving release event to be input as training set data of the deep-learning network.

Figure 10:
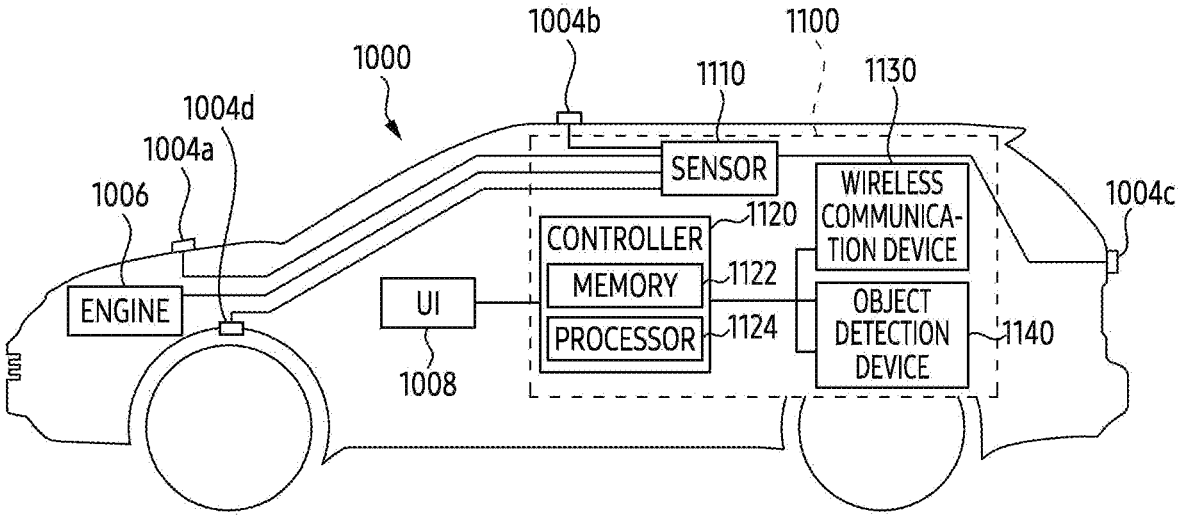
FIGS. 10 and 11 respectively illustrate an example of a block diagram depicting an autonomous driving mobile body, according to an embodiment.
Figure 11:
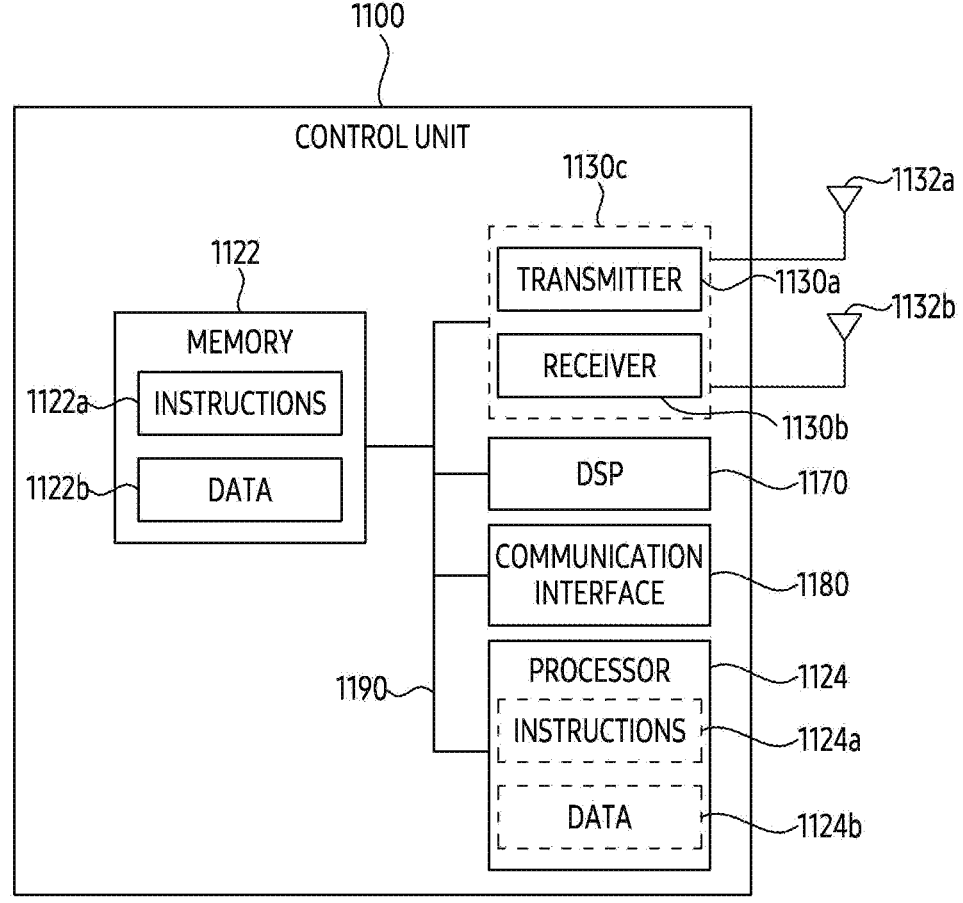

FIGS. 10 and 11 illustrate an example of a block diagram representing an autonomous mobile vehicle, according to an embodiment. Referring first to FIG. 10, an autonomous driving vehicle 1000 according to this embodiment may include a control unit 1100, sensing modules (1004a, 804b, 804c, 804d), an engine 1006, and a user interface 1008.

The autonomous driving vehicle 1000 may have an autonomous driving mode or a manual driving mode. For example, the vehicle may switch from a manual driving mode to an autonomous driving mode, or from an autonomous driving mode to a manual driving mode, based on a user input received via the user interface 1008.

When the mobile vehicle 1000 is set in the autonomous driving mode, the autonomous driving vehicle 1000 may be operated under the control of the control unit 1100.

In this embodiment, the control unit 1100 may comprise a controller 1120 including a memory 1122 and a processor 1124, a sensor 1110, a communication device 1130, and an object detection device 1140.

Here, the object detection device 1140 may perform all or some of the functions of a distance measuring device (e.g., the electronic device 101).

In this embodiment, the object detection device 1140 is a device for detecting an object located out of the mobile vehicle 1000, and the object detection device 1140 may detect the object located in an outside of the mobile vehicle 1000 and generate object information based on a result of the detection.

The object information may include information about the presence or absence of the object, location information of the object, distance information between the mobile vehicle and the object, and relative speed information in between the mobile vehicle and the object.

The object may include a variety of objects located outside the mobile vehicle 1000, such as e.g., lanes, other vehicles, pedestrians, traffic signals, light, roads, structures, speed bumps, terrain, animals, and the like. Here, the traffic signals may refer to traffic lights, traffic signs, patterns or text painted on a road surface, or the like. The light may be light generated by a lamp on another vehicle, light generated by a street light, or sunlight.

The structure may be an object located along the roadway and fixed to the ground. For example, the structure may include streetlights, street trees, buildings, utility poles, traffic lights, bridges or the like. The terrain may include mountains, hills, and the like.

Such an object detection device 1140 may include a camera module. The controller 1120 may extract object information from external images taken by the camera module and cause the information to be processed by the controller 1120.

Further, the object detection device 1140 may include imaging devices for recognizing a surrounding environment. In addition to LIDAR, RADAR, GPS devices, odometry and other computer vision devices, ultrasonic sensors, and infrared sensors may be utilized, and these devices may be selected as needed or operated simultaneously to allow for more precise detection.

For an example, a distance measuring device according to an embodiment of the disclosure may calculate a distance between the autonomous driving vehicle 1000 and a certain object and control operation of the mobile vehicle based on the calculated distance, in conjunction with the control unit 1100 of the autonomous driving vehicle 1000.

In one example, when there is a possibility of collision depending upon the distance between the autonomous driving vehicle 1000 and the object, the autonomous driving vehicle 1000 may control the brakes to slow down or stop. As another example, in case where the object is a moving object, the autonomous driving vehicle 1000 may control the driving speed of the autonomous driving vehicle 1000 to maintain a predetermined distance from the object.

The distance measuring device according to such an embodiment of the disclosure may be configured as one module within the control unit 1100 of the autonomous driving vehicle 1000. In other words, the memory 1122 and the processor 1124 of the control unit 1100 may cause the collision avoidance method according to the disclosure to be implemented in software.

Further, the sensor 1110 may be connected to the sensing modules (1004a, 804b, 804c, 804d) to obtain various sensing information about the environment inside/outside the mobile vehicle. Here, the sensors 1110 may include posture sensor (e.g., yaw sensor, roll sensor, pitch sensor), collision sensor, wheel sensor, speed sensor, tilt sensor, weight detection sensor, heading sensor, gyro sensor, position module, mobile vehicle forward/backward sensor, battery sensor, fuel sensor, tire sensor, steering sensor by rotation of steering wheel, in-vehicle temperature sensor, in-vehicle humidity sensor, ultrasonic sensor, illumination sensor, accelerator pedal position sensor, brake pedal position sensor, and the like.

Accordingly, the sensors 1110 may obtain various information including vehicle posture information, vehicle collision information, vehicle orientation information, vehicle location information (GPS information), vehicle angle information, vehicle speed information, vehicle acceleration information, vehicle tilt information, vehicle forward/backward information, battery information, fuel information, tire information, vehicle lamp information, temperature information inside vehicle, humidity information inside the vehicle, steering wheel rotation angle, illuminance outside the vehicle, pressure applied to an accelerator pedal, pressure applied to a brake pedal, and the like.

The sensors 1110 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, a crank angle sensor (CAS), and the like.

As such, the sensors 1110 may generate vehicle status information based on the sensing data.

The wireless communication device 1130 may be configured to implement wireless communication between the autonomous driving vehicle 1000. For example, the wireless communication device 1130 may enable the autonomous driving vehicle 1000 to communicate with a user's mobile phone, or another wireless communication device 1130, another mobile vehicle, a centralized apparatus (traffic control unit), a server, or the like. The wireless communication device 1130 may transmit and/or receive wireless signals according to predetermined wireless access protocols. The wireless communication protocols may be, although not limited to, Wi-Fi, Bluetooth, Long-Term Evolution (LTE), Code Division Multiple Access (CDMA), Wideband Code Division Multiple Access (WCDMA), Global Systems for Mobile Communications (GSM), or the like.

Further, it would be also possible for the autonomous driving vehicle 1000 in this embodiment to implement communication between mobile vehicles via the wireless communication device 1130. In other words, the wireless communication device 1130 may communicate with another mobile vehicle, for example, other vehicles on the road in vehicle-to-vehicle (V2V) communication. The autonomous driving vehicle 1000 may transmit and receive information, such as driving alerts and traffic information, via the V2V communication, and may request or receive information from other mobile vehicles. For example, the wireless communication device 1130 may perform the V2V communication with a dedicated short-range communication (DSRC) device or a cellular-V2V (C-V2V) device. In addition to the V2V communication, communication (e.g., vehicle to everything communication, V2X) between vehicles and other objects (e.g., electronic devices carried by pedestrians) may be also implemented via the wireless communication device 1130.

Further, the wireless communication device 1130 may obtain, over a non-terrestrial network (NTN) other than terrestrial networks, information generated from infrastructure installed on roads (e.g., traffic signals, CCTV, RSUs, eNodeB, etc.) or various mobilities including other autonomous driving/non-autonomous driving vehicles, as information for performing autonomous driving of the autonomous driving vehicle 1000.

For example, the wireless communication device 1130 may perform wireless communication with a Low Earth Orbit (LEO) satellite system, a Medium Earth Orbit (MEO) satellite system, a Geostationary Orbit (GEO) satellite system, a High Altitude Platform (HAP) system, or the like, constituting the non-terrestrial network, via a dedicated non-terrestrial network antenna mounted on the autonomous driving vehicle 1000.

For example, the wireless communication device 1130 may perform wireless communication with various platforms making up the NTN according to a wireless access specification in accordance with the 5G NR NTN (5th Generation New Radio Non-Terrestrial Network) standard currently under discussion in 3GPP and elsewhere, without limitation, although the disclosure is not limited thereto.

In this embodiment, the controller 1120 may control the wireless communication device 1130 to select a platform capable of appropriately performing NTN communications and to perform wireless communications with the selected platform, taking into account various information such as e.g., the location of the autonomous driving vehicle 1000, the current time, available power, or the like.

In this embodiment, the controller 1120, which is a unit to control the overall operation of each unit within the mobile vehicle 1000, may be configured at the time of manufacture by a manufacturer of the mobile vehicle, or may be further configured after manufacture to perform the functions of autonomous driving. Alternatively, the controller 1120 may be further configured to perform additional functions on an ongoing basis through upgrades to the controller 1120 configured during its manufacturing. Such a controller 1120 may be referred to as an electronic control unit (ECU).

The controller 1120 may collect various data from the sensors 1110, the object detection device 1140, the wireless communication device 1130, or the like, and may transmit control signals based on the collected data to the sensors 1110, the engine 1006, the user interface 1008, the wireless communication device 1130, the object detection device 1140, or other configurations in the mobile vehicle. The control signals may be also transmitted to an acceleration device, a braking system, a steering device, or a navigation device associated with driving the mobile vehicle, although not shown herein.

In this embodiment, the controller 1120 may control the engine 1006, for example, to detect a speed limit on a roadway on which the autonomous driving vehicle 1000 is traveling and control the engine 1006 so that its driving speed does not exceed the speed limit, or may control the engine 1006 to accelerate the driving speed of the autonomous driving vehicle 1000 within a range that does not exceed the speed limit.

Further, when the autonomous driving vehicle 1000 is approaching or leaving a lane while the autonomous vehicle 1000 is travelling, the controller 1120 may determine whether such approaching or departing from the lane accrue from a normal driving situation or other abnormal driving situations, and may control the engine 1006 to control the driving of the vehicle according to a result of the determination. Specifically, the autonomous driving vehicle 1000 may detect lanes positioned on either side of the lane where the mobile vehicle is traveling. In this case, the controller 1120 may determine whether the autonomous driving vehicle 1000 is approaching or departing from the lane, and if it is determined that the autonomous driving vehicle 1000 is approaching or departing from the lane, the controller 1120 may determine whether such driving is due to a normal and exact driving situation or other driving situation. Here, an example of a normal driving situation may be a situation where a mobile vehicle needs to change lane. Further, an example of other driving situations may be a situation where the mobile vehicle does not need to change lane. If it is determined that the autonomous driving vehicle 1000 is approaching or departing from the lane in a situation that it is not necessary for the mobile vehicle to change the lane, the controller 1120 may control the driving of the autonomous driving vehicle 1000 such that the autonomous driving vehicle 1000 does not depart from the lane and continues to drive normally in that lane.

When another mobile vehicle or any obstruction is present in front of the mobile vehicle, the engine 1006 or braking system may be controlled to slow down the driving speed of the mobile vehicle, and in addition to the driving speed, the trajectory, driving route, and steering angle of the mobile vehicle may be controlled. Alternatively, the controller 1120 may control the driving of the mobile vehicle by generating control signals as necessary, based on information perceived from the external environment, such as the driving lane or driving signals of the mobile vehicle, and so on.

In addition to generating its own control signals, the controller 1120 may also control the driving of the mobile vehicle, by communicating with neighboring mobile vehicles or a central server and transmitting instructions to control peripheral devices with the received information.

Further, when the position of the camera module (e.g., the camera 112 of FIG. 2) is changed or the angle of view is changed, it may be difficult for the controller to perform an accurate recognition of moving vehicle or lane according to the embodiment, so the controller 1120 may generate a control signal to cause the camera module to perform calibration so as to prevent occurrence of such an inaccurate recognition. Thus, according to this embodiment, by generating a calibration control signal to the camera module, the controller 1120 may continuously maintain the normal mounting position, orientation, angle of view or the like of the camera module, even if the mounting position of the camera module is changed due to vibrations or impacts generated by the movement of the autonomous driving vehicle 1000. The controller 1120 may generate a control signal to perform calibration of the camera module in case where the initial mounting position, orientation, and angle of view information pre-stored of the camera module are different, by a predetermined threshold value or more, from the initial mounting position, orientation, and angle of view information of the camera module measured during driving of the autonomous driving vehicle 1000.

In this embodiment, the controller 1120 may include a memory 1122 and a processor 1124. The processor 1124 may execute software stored in the memory 1122 in response to control signals from the controller 1120. Specifically, the controller 1120 may store data and instructions for performing a lane detection method according to the disclosure in the memory 1122, wherein the instructions may be executed by the processor 1124 to implement one or more methods described herein.

In this case, the memory 1122 may be stored on a non-volatile recording medium that can be executed by the processor 1124. The memory 1122 may store software and data via any suitable internal/external devices. The memory 1122 may include a random access memory (RAM), a read only memory (ROM), a hard disk, or a memory 1122 connected with a dongle.

The memory 1122 may store at least an operating system (OS), user applications, and executable instructions. The memory 1122 may also store application data, array data structures, or the like.

The processor 1124 may include a microprocessor or any suitable electronic processor, such as e.g., a controller, a microcontroller, or a state machine.

The processor 1124 may be implemented as a combination of computing devices, and the computing devices may include a digital signal processor, a microprocessor, or any suitable combination thereof.

Meanwhile, the autonomous driving vehicle 1000 may further include a user interface 1008 for user input to the control unit 1100 described above. The user interface 1008 may allow the user to enter information with any suitable interaction. For example, it may be implemented with a touchscreen, a keypad, operation buttons, or the like. The user interface 1008 may transmit inputs or commands to the controller 1120, and the controller 1120 may perform a control operation of the mobile vehicle in response to the inputs or commands.

Further, the user interface 1008 may cause the autonomous driving vehicle 1000 to communicate with an electronic device located outside the autonomous driving vehicle 1000 via the wireless communication device 1130. For example, the user interface 1008 may be in association with a mobile phone, a tablet, or any other computer device.

Furthermore, while the autonomous driving vehicle 1000 is described in this embodiment as including the engine 1006, it is possible for the mobile vehicle to include other types of propulsion systems. For example, the mobile vehicle may be powered by electrical energy, hydrogen energy, or a hybrid system of any combination thereof. Thus, the controller 1120 may include a propulsion mechanism according to the propulsion system of the autonomous driving vehicle 1000, and may provide control signals to configuration elements of each propulsion mechanism accordingly.

Hereinafter, referring to FIG. 11, description will be made of a configuration of the control unit 1100 according to the embodiment in more detail.

The control unit 1100 includes a processor 1124. The processor 1124 may be any one of a general purpose single or multi-chip microprocessor, a dedicated microprocessor, a microcontroller, a programmable gate array, or the like. The processor may also be referred to as a central processing unit (CPU). The processor 1124 in this embodiment may include a combination of a plurality of processors, in use.

The control unit 1100 also includes a memory 1122. The memory 1122 may be any electronic component capable of storing electronic information. The memory 1122 may also include a combination of multiple memories in addition to a single memory.

Data 1122b and instructions 1122a for use in performing a distance measurement method of a distance measuring device according to the disclosure may be stored in the memory 1122. When the processor 1124 executes the instructions 1122a, all or a part of the instructions 1122a and the data 1122b required to perform the instructions may be loaded (1124a, 924b) onto the processor 1124.

The control unit 1100 may include a transmitter 1130a, a receiver 1130b, or a transceiver 1130c to allow for transmission and reception of signals. One or more antennas (1132a, 932b) may be electrically connected to the transmitter 1130a, the receiver 1130b, or the respective transceiver 1130c, and may include additional antennas.

The control unit 1100 may further include a digital signal processor (DSP) 1170. The DSP 1170 may allow digital signals to be processed quickly by the mobile vehicle.

The control unit 1100 may further include a communication interface 1180. The communication interface 1180 may include one or more ports and/or communication modules for connecting other devices to the control unit 1100. The communication interface 1180 may allow the user to interact with the control unit 1100.

Various configurations of the control unit 1100 may be connected together by one or more buses 1190, which may include a power bus, a control signal bus, a status signal bus, a data bus, or the like. Under the control of the processor 1124, the configurations may communicate with each other via the buses 1190 to perform their intended functions.

Figure 12:
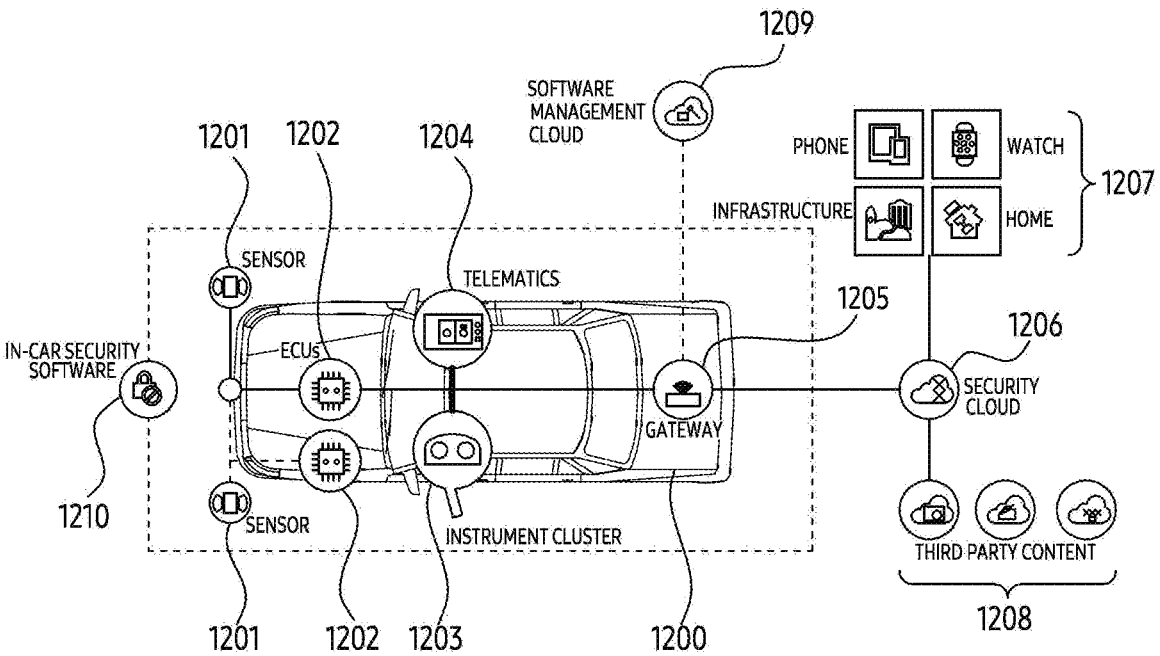
FIG. 12 illustrates an example of a gateway associated with a user equipment, according to various embodiments.

In the meantime, in various embodiments, the control system 900 may be associated with a gateway for communication with a security cloud. For example, referring to FIG. 12, the control system 900 may be associated with a gateway 1205 for providing information obtained from at least one of components 1201 to 1204 of the vehicle 1200 to security cloud 1206. For example, the gateway 1205 may be included within the control system 900. For another example, the gateway 1205 may be configured as a separate device within the vehicle 1200 that is distinct from the control system 900. The gateway 1205 may communicably connect a network within the vehicle 1200 that are secured by a software management cloud 1209, a security cloud 1206, and in-car security software 1210, which have different networks.

For example, the components 1201 may be a sensor. For example, the sensor may be used to obtain information about at least one of a condition of the vehicle 1200 or a condition in the vicinity of the vehicle 1200. For example, the component 1201 may include the sensor 910.

For example, the components 1202 may be electronic control units (ECUs). For example, the ECUs may be used for engine control, transmission control, or airbag control, or manage tire air-pressure.

For example, the component 1203 may be an instrument cluster. For example, the instrument cluster may refer to a panel located in front of a driver's seat of a dashboard. For example, the instrument cluster may be configured to display information (or passenger) that is necessary for driving, for the driver. For example, the instrument cluster may be used to display at least one of visual elements to indicate revolutions (or rotations) per minute (RPM) of the engine, visual elements to indicate the speed of the vehicle 1200, visual elements to indicate the amount of fuel remaining, visual elements to indicate the state of transmission gears, or visual elements to indicate information obtained via the component 1201.

For example, the component 1204 may be a telematics device. For example, the telematics device may be a device for combining wireless communication technology with global positioning system (GPS) technology to provide various mobile communication services, such as positional information or safe driving, within the vehicle 1200. For example, the telematics device may be used to connect the vehicle 1200 with a driver, a cloud (e.g., security cloud 1206), and/or the surrounding environment. For example, the telematics device may be configured to support high bandwidth and low latency for 5G NR standard technologies (e.g., V2X technology of 5G NR, Non-Terrestrial Network (NTN) technology of 5G NR). For example, the telematics device may be configured to support the autonomous driving of the vehicle 1200.

For example, the gateway 1205 may be used to connect a network in the vehicle 1200 with and a network out of the vehicle 1200, which may be, for example, a software management cloud 1209 or the security cloud 1206. For example, the software management cloud 1209 may be used to update or manage at least one software required for driving and managing the vehicle 1200. For example, the software management cloud 1209 may be associated with the in-car security software 1210 installed within the vehicle. For example, the in-car security software 1210 may be used to provide security features in the vehicle 1200. For example, the in-car security software 1210 may encrypt data transmitted and received through the in-vehicle network, using an encryption key obtained from an external authorized server for encryption of the in-vehicle network. In various embodiments, the encryption key used by the in-car security software 1210 may be generated based on identification information of that vehicle (e.g., license plate, vehicle identification number (VIN)) or information uniquely assigned to each user (e.g., user identification information).

In various embodiments, the gateway 1205 may transmit data encrypted by the in-car security software 1210 based on the encryption key, to the software management cloud 1209 and/or the security cloud 1206. The software management cloud 1209 and/or the security cloud 1206 may decrypt the data encrypted by the encryption key of the in-car security software 1210, using a decryption key capable of decrypting the data, thereby identifying which vehicle or which user the data has received from. For example, since the decryption key is a unique key corresponding to the encryption key, the software management cloud 1209 and/or the security cloud 1206 may identify a transmitting subject of the data (e.g., the vehicle or the user), based on the data decrypted through the decryption key.

For example, the gateway 1205 may be configured to support the in-car security software 1210 and may be associated with the control unit 1100. For example, the gateway 1205 may be associated with the control system 900 to support connection between the control system 900 and the client devices 1207 connected with the security cloud 1206 and. For another example, the gateway 1205 may be associated with the control system 900 to support connection between control system 900 and a third-party cloud 1208 connected with the security cloud 1206, but the disclosure is not limited thereto.

In various embodiments, the gateway 1205 may be used to connect the vehicle 1200 with the software management cloud 1209 for managing the operating software of the vehicle 1200. For example, the software management cloud 1209 may monitor whether an update of the operating software of the vehicle 1200 is required, and may provide data to update the operating software of the vehicle 1200 via the gateway 1205, based on monitoring that the update of the operating software of the vehicle 1200 is required. For another example, the software management cloud 1209 may receive, via gateway 1205, a user request that requires the update of the operating software of the vehicle 1200, from vehicle 1200, and may provide data for updating the operating software of the vehicle 1200 based on the receiving. However, the present disclosure is not limited thereto.

Figure 13:
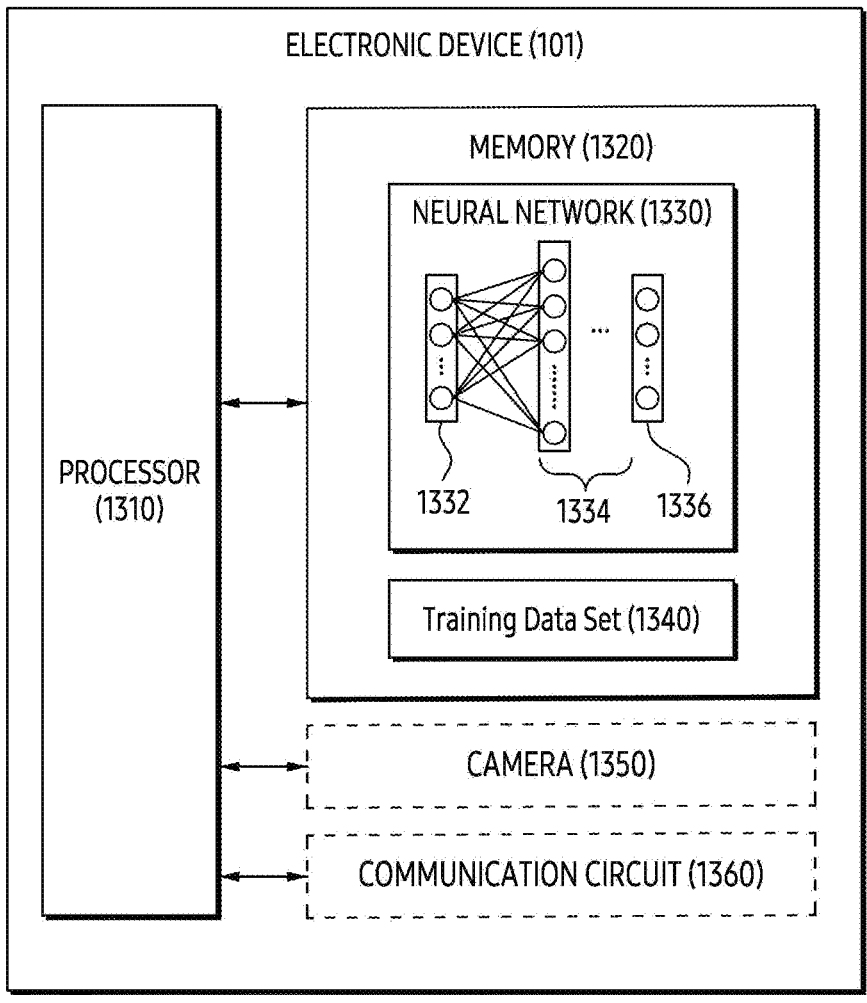
FIG. 13 is a block diagram of an electronic device according to an embodiment.

FIG. 13 is a block diagram of an electronic device 101, according to an embodiment. The electronic device 101 of FIG. 13 may include the electronic device of FIGS. 1 through 12.

Referring to FIG. 13, a processor 1310 of the electronic device 101 may perform computations related to a neural network 1330 stored in a memory 1320. The processor 1310 may include at least one of a center processing unit (CPU), a graphic processing unit (GPU), or a neural processing unit (NPU). The NPU may be implemented as a separate chip from the CPU, or may be integrated into the same chip as the CPU in the form of a system-on-chip (SoC). The NPUs integrated into the CPU may be referred to as a neural core and/or an artificial intelligence (AI) accelerator.

Referring to FIG. 13, the processor 1310 may identify the neural network 1330 stored in the memory 1320. The neural network 1330 may include an input layer 1332, one or more hidden layers 1334 (or a combination of intermediate layers), and an output layer 1336, or a combination thereof. The layers described above (e.g., input layer 1332, one or more hidden layers 1334, and output layer 1336) may include a plurality of nodes. The number of hidden layers 1334 may vary depending on various embodiments, and the neural network 1330 including a plurality of hidden layers 1334 may be referred to as a deep neural network. The operation of training the deep neural network may be referred to as deep-learning.

In an embodiment, in case where the neural network 1330 has the structure of a feed forward neural network, a first node included in a particular layer may be connected to all of second nodes included in other layers prior to that particular layer. Within the memory 1320, the parameters stored for the neural network 1330 may include weights assigned to the connections between the second nodes and the first node. In the neural network 1330 having the structure of a feed forward neural network, a value of the first node may correspond to a weighted sum of the values assigned to the second nodes, based on the weights assigned to the connections connecting the second nodes and the first node.

In an embodiment, in case where the neural network 1330 has the structure of a convolutional neural network, a first node included in a particular layer may correspond to a weighted sum of some of the second nodes included in other layers prior to the particular layer. Some of the second nodes corresponding to the first node may be identified by a filter corresponding to the particular layer. In the memory 1320, the parameters stored for the neural network 1330 may include weights indicating the filter. The filter may include weights corresponding to one or more nodes to be used in calculating the weighted sum of the first node, and each of the one or more nodes, among the second nodes.

According to an embodiment, the processor 1310 of the electronic device 101 may perform training for the neural network 1330, using a training data set 1340 stored in the memory 1320. Based on the training data set 1340, the processor 1310 may adjust one or more parameters stored in the memory 1320 for the neural network 1330.

According to an embodiment, the processor 1310 of the electronic device 101 may perform object detection, object recognition, and/or object classification, using the neural network 1330 trained based on the training data set 1340. The processor 1310 may input images (or video) acquired through the camera 1350 into the input layer 1332 of the neural network 1330. Based on the image input to the input layer 1332, the processor 1310 may sequentially obtain values of nodes in the layers included in the neural network 1330 to obtain a set of values of nodes in the output layer 1336 (e.g., output data). The output data may be used as a result of inferring information contained in the image using the neural network 1330. The processor 1310 may input images (or video) obtained from an external electronic device connected to the electronic device 101 via the communication circuit 1360 into the neural network 1330, but the embodiment of the present disclosure is not limited thereto.

In an embodiment, the neural network 1330 trained to process an image may be used to identify a region, within the image, corresponding to a subject (object detection), and/or to identify a class of the object represented within the image (object recognition and/or object classification). For example, the electronic device 101 may use the neural network 1330 to segment, within the image, the region corresponding to the subject, based on the shape of a rectangle, such as a bounding box. For example, the electronic device 101 may use the neural network 1330 to identify, from a plurality of specified classes, at least one class that matches the subject.

As described above, according to an embodiment, an electronic device may comprise a camera and a processor. The processor may be configured to obtain, from an image obtained using the camera, two-dimensional coordinate values representing vertices of a portion related to an external object. The processor may be configured to identify a first line extending along a reference direction on a reference plane included in the image and overlapping a first vertex of the vertices, and a second line connecting a reference point within the image and a second vertex of the vertices. The processor may be configured to, based on an intersection of the first line and the second line, obtain three-dimensional coordinate values representing each of vertices of a three-dimensional external space corresponding to the external object.

For example, the processor may be configured to identify a third line connecting a third vertex of the vertices of the portion and a two-dimensional point corresponding to the intersection. The processor may be configured to identify an intersection of a fourth line connecting the first vertex and the second vertex and the third line. The processor may be configured to determine a three-dimensional point identified performing unprojection of the intersection of the fourth line and the third line, as any one vertex of any of the vertices of the external space corresponding to the external object.

For example, the processor may be configured to determine a three-dimensional point corresponding to an intersection of a fifth line extending along the reference direction from the three-dimensional point and a sixth line connecting the first vertex and a fourth vertex of vertices of the portion, as another vertex of the vertices of the external space.

For example, the processor may be configured to determine a three-dimensional point corresponding to an intersection of a seventh line extending from the three-dimensional point along a different direction perpendicular to the reference direction and an eighth line connecting the second vertex and the third vertex, as the other vertex of the vertices of the external space.

For example, the processor may be configured to obtain the two-dimensional coordinate values, using a neural network trained for object recognition.

For example, the processor may be configured to compensate for distortions contained in the image and caused by a lens of the camera, using an intrinsic parameter for the camera.

For example, the processor may be configured to obtain the two-dimensional coordinate values for the portion within the image for which the distortion has been compensated.

As described above, according to an embodiment, a method of an electronic device may comprise obtaining, from an image obtained using a camera of the electronic device, two-dimensional coordinate values representing vertices of a portion related to an external object. The method may comprise identifying a first line extending along a reference direction on a reference plane included in the image and overlapping a first vertex of the vertices, and a second line connecting a reference point within the image and a second vertex of the vertices. The method may comprise, based on an intersection of the first line and the second line, obtaining three-dimensional coordinate values representing each of vertices of a three-dimensional external space corresponding to the external object.

For example, the obtaining the three-dimensional coordinate values may comprise identifying a third line connecting a third vertex of the vertices of the portion and a two-dimensional point corresponding to the intersection. The obtaining the three-dimensional coordinate values may comprise identifying an intersection of a fourth line connecting the first vertex and the second vertex and the third line. The obtaining the three-dimensional coordinate values may comprise determining a three-dimensional point identified performing unprojection of the intersection of the fourth line and the third line, as any one vertex of any of the vertices of the external space corresponding to the external object.

For example, the obtaining the three-dimensional coordinate values may comprise determining a three-dimensional point corresponding to an intersection of a fifth line extending along the reference direction from the three-dimensional point and a sixth line connecting the first vertex and a fourth vertex of vertices of the portion, as another vertex of the vertices of the external space.

For example, the obtaining the three-dimensional coordinate values may comprise determining a three-dimensional point corresponding to an intersection of a seventh line extending from the three-dimensional point along a different direction perpendicular to the reference direction and an eighth line connecting the second vertex and the third vertex, as the other vertex of the vertices of the external space.

For example, the obtaining the two-dimensional coordinate values may comprise obtaining the two-dimensional coordinate values, using a neural network trained for object recognition.

For example, the method may further comprise compensating for distortions contained in the image and caused by a lens of the camera, using an intrinsic parameter for the camera.

For example, the obtaining the two-dimensional coordinate values may comprise obtaining the two-dimensional coordinate values for the portion within the image for which the distortion has been compensated.

As described above, according to an embodiment, a computer-readable storage medium may comprise instructions. The instructions may, when executed by a processor of an electronic device, cause the electronic device to obtain, from an image obtained using the camera, two-dimensional coordinate values representing vertices of a portion related to an external object. The instructions may, when executed by a processor of an electronic device, cause the electronic device to identify a first line extending along a reference direction on a reference plane included in the image and overlapping a first vertex of the vertices, and a second line connecting a reference point within the image and a second vertex of the vertices. The instructions may, when executed by a processor of an electronic device, cause the electronic device to, based on an intersection of the first line and the second line, obtain three-dimensional coordinate values representing each of vertices of a three-dimensional external space corresponding to the external object.

For example, the instructions may, when executed by a processor of an electronic device, cause the electronic device to identify a third line connecting a third vertex of the vertices of the portion and a two-dimensional point corresponding to the intersection. The instructions may, when executed by a processor of an electronic device, cause the electronic device to identify an intersection of a fourth line connecting the first vertex and the second vertex and the third line. The instructions may, when executed by a processor of an electronic device, cause the electronic device to determine a three-dimensional point identified performing unprojection of the intersection of the fourth line and the third line, as any one vertex of any of the vertices of the external space corresponding to the external object.

For example, the instructions may, when executed by a processor of an electronic device, cause the electronic device to determine a three-dimensional point corresponding to an intersection of a fifth line extending along the reference direction from the three-dimensional point and a sixth line connecting the first vertex and a fourth vertex of vertices of the portion, as another vertex of the vertices of the external space.

For example, the instructions may, when executed by a processor of an electronic device, cause the electronic device to determine a three-dimensional point corresponding to an intersection of a seventh line extending from the three-dimensional point along a different direction perpendicular to the reference direction and an eighth line connecting the second vertex and the third vertex, as the other vertex of the vertices of the external space.

For example, the instructions may, when executed by a processor of an electronic device, cause the electronic device to obtain the two-dimensional coordinate values, using a neural network trained for object recognition.

For example, the instructions may, when executed by a processor of an electronic device, cause the electronic device to compensate for distortions contained in the image and caused by a lens of the camera, using an intrinsic parameter for the camera.

What is claimed is:

1. An electronic device, comprising:
a camera configured to obtain an image; and
a processor,
wherein the processor is configured to:
compensate for distortions of the image caused by a lens of the camera, using an intrinsic parameter for the camera;
obtain, from the image obtained using the camera, two-dimensional coordinate values representing vertices of a portion related to an external object;
identify a first line extending along a reference direction on a reference plane included in the image and overlapping a first vertex of the vertices, and a second line connecting a reference point within the image and a second vertex of the vertices; and
based on an intersection of the first line and the second line, obtain three-dimensional coordinate values representing each of vertices of a three-dimensional external space corresponding to the external object, and
wherein the vertices of the external space include a three-dimensional point corresponding to an intersection of a third line connecting a third vertex of the vertices of the portion and the intersection of the first and second lines, and a fourth line connecting the first and second vertices.

2. The electronic device of claim 1, wherein the processor is configured to:
determine the three-dimensional point by performing unprojection of the intersection of the third line and the fourth line.

3. The electronic device of claim 2, wherein the processor is configured to:
determine a three-dimensional point corresponding to an intersection of a fifth line extending along the reference direction from the three-dimensional point and a sixth line connecting the first vertex and a fourth vertex of vertices of the portion, as another vertex of the vertices of the external space.

4. The electronic device of claim 2, wherein the processor is configured to:
determine a three-dimensional point corresponding to an intersection of a seventh line extending from the three-dimensional point along a different direction perpendicular to the reference direction and an eighth line connecting the second vertex and the third vertex, as the other vertex of the vertices of the external space.

5. The electronic device of claim 1, wherein the processor is configured to obtain the two-dimensional coordinate values, using a neural network trained for object recognition.

6. The electronic device of claim 1, wherein the processor is configured to determine a distance to the external object based on the three-dimensional coordinate values.

7. The electronic device of claim 1, wherein the processor is configured to obtain the two-dimensional coordinate values for the portion within the image for which the distortion has been compensated.

8. A method of an electronic device, comprising:
compensating for distortions of an image obtained by a camera of the electronic device and caused by a lens of the camera, using an intrinsic parameter for the camera;
obtaining, from the image, two-dimensional coordinate values representing vertices of a portion related to an external object;
identifying a first line extending along a reference direction on a reference plane included in the image and overlapping a first vertex of the vertices, and a second line connecting a reference point within the image and a second vertex of the vertices; and
based on an intersection of the first line and the second line, obtaining three-dimensional coordinate values representing each of vertices of a three-dimensional external space corresponding to the external object, and
wherein the vertices of the external space include a three-dimensional point corresponding to an intersection of a third line connecting a third vertex of the vertices of the portion and the intersection of the first and second lines, and a fourth line connecting the first and second vertices.

9. The method of claim 8, wherein the obtaining the three-dimensional coordinate values comprises:
determining the three-dimensional point by performing unprojection of the intersection of the third line and the fourth line.

10. The method of claim 9, wherein the obtaining the three-dimensional coordinate values comprises:
determining a three-dimensional point corresponding to an intersection of a fifth line extending along the reference direction from the three-dimensional point and a sixth line connecting the first vertex and a fourth vertex of vertices of the portion, as another vertex of the vertices of the external space.

11. The method of claim 9, wherein the obtaining the three-dimensional coordinate values comprises:
determining a three-dimensional point corresponding to an intersection of a seventh line extending from the three-dimensional point along a different direction perpendicular to the reference direction and an eighth line connecting the second vertex and the third vertex, as the other vertex of the vertices of the external space.

12. The method of claim 8, wherein the obtaining the two-dimensional coordinate values comprises:
obtaining the two-dimensional coordinate values, using a neural network trained for object recognition.

13. The method of claim 8, further comprising:
determining a distance to the external object based on the three-dimensional coordinate values.

14. The method of claim 8, wherein the obtaining the two-dimensional coordinate values comprises:
obtaining the two-dimensional coordinate values for the portion within the image for which the distortion has been compensated.

15. A non-transitory computer-readable storage medium comprising instructions that, when executed by a processor of an electronic device, cause the electronic device to:

compensate for distortions of an image obtained by a camera of the electronic device and caused by a lens of the camera, using an intrinsic parameter for the camera;

obtain, from the image, two-dimensional coordinate values representing vertices of a portion related to an external object;

identify a first line extending along a reference direction on a reference plane included in the image and overlapping a first vertex of the vertices, and a second line connecting a reference point within the image and a second vertex of the vertices; and based on an intersection of the first line and the second line, obtain three-dimensional coordinate values representing each of vertices of a three-dimensional external space corresponding to the external object, and wherein the vertices of the external space include a three-dimensional point corresponding to an intersection of a third line connecting a third vertex of the vertices of the portion and the intersection of the first and second lines, and a fourth line connecting the first and second vertices.

16. The non-transitory computer-readable storage medium of claim 15, wherein the instructions, when executed by the processor of the electronic device, cause the electronic device to:

determine the three-dimensional point by performing unprojection of the intersection of the third line and the fourth line.

17. The non-transitory computer-readable storage medium of claim 16, wherein the instructions, when executed by the processor of the electronic device, cause the electronic device to:

determine a three-dimensional point corresponding to an intersection of a fifth line extending along the reference direction from the three-dimensional point and a sixth line connecting the first vertex and a fourth vertex of vertices of the portion, as another vertex of the vertices of the external space.

18. The non-transitory computer-readable storage medium of claim 16, wherein the instructions, when executed by the processor of the electronic device, cause the electronic device to:

determine a three-dimensional point corresponding to an intersection of a seventh line extending from the three-dimensional point along a different direction perpendicular to the reference direction and an eighth line connecting the second vertex and the third vertex, as the other vertex of the vertices of the external space.

19. The non-transitory computer-readable storage medium of claim 15, wherein the instructions, when executed by the processor of the electronic device, cause the electronic device to obtain the two-dimensional coordinate values, using a neural network trained for object recognition.

20. The non-transitory computer-readable storage medium of claim 15, wherein the instructions, when executed by the processor of the electronic device, cause the electronic device to:

determine a distance to the external object based on the three-dimensional coordinate values.

* * * * *